(12) United States Patent
Anderson et al.

(10) Patent No.: US 11,813,904 B2
(45) Date of Patent: Nov. 14, 2023

(54) TRAILER HITCH SYSTEM WITH SCALE BALL MOUNT

(71) Applicant: Progress Mfg. Inc., Provo, UT (US)

(72) Inventors: Jed K. Anderson, Lindon, UT (US); Jason Harper, Springville, UT (US); Matthew Barnes, Lehi, UT (US)

(73) Assignee: Progress Mfg. LLC, Provo, UT (US)

( * ) Notice: Subject to any disclaimer, the term of this patent is extended or adjusted under 35 U.S.C. 154(b) by 603 days.

(21) Appl. No.: 16/840,232

(22) Filed: Apr. 3, 2020

(65) Prior Publication Data

US 2020/0384817 A1    Dec. 10, 2020

Related U.S. Application Data

(63) Continuation of application No. 16/681,654, filed on Nov. 12, 2019, now abandoned, which is a
(Continued)

(51) Int. Cl.
*B60D 1/24* (2006.01)
*B60D 1/06* (2006.01)
(Continued)

(52) U.S. Cl.
CPC .............. *B60D 1/248* (2013.01); *B60D 1/06* (2013.01); *G01G 19/02* (2013.01); *G01G 19/08* (2013.01); *G01L 5/136* (2013.01)

(58) Field of Classification Search
CPC .......... B60D 1/248; B60D 1/06; G01G 19/02; G01G 19/08; G01L 5/136
See application file for complete search history.

(56) References Cited

U.S. PATENT DOCUMENTS

| 3,700,053 A | 10/1972 | Glissendorf |
| 4,056,155 A | 11/1977 | Wahl |

(Continued)

FOREIGN PATENT DOCUMENTS

| DE | 10211572 | 10/2003 |
| EP | 2363307 | 9/2011 |

(Continued)

OTHER PUBLICATIONS

AutoAnything—Weigh Safe WS6-2-6" Drop Fits 2" Receiver Adjustable Trailer Hitch Ball Mounts—http://www.autoanything.com/towing/77A10506A4151255.aspx, at least as early as Feb. 7, 2016.
(Continued)

*Primary Examiner* — Kevin Hurley
*Assistant Examiner* — Marlon A Arce
(74) *Attorney, Agent, or Firm* — Morriss O'Bryant; COMPAGNI CANNON, PLLC

(57) ABSTRACT

A trailer hitch system may include a scale ball mount for supporting a hitch ball as part of a trailer hitch system, and for measuring the tongue weight of a trailer. The scale ball mount may comprise a trailer hitch ball mount. In an embodiment, the scale ball mount may include a biasing component disposed below a hitch ball and a gauge for displaying downward force applied at the hitch ball. The biasing component may be a urethane spring. An indicator may be disposed between the biasing component and the hitch ball, and the indicator may be viewable through an opening in the gauge.

50 Claims, 30 Drawing Sheets

Related U.S. Application Data continuation of application No. 16/430,213, filed on Jun. 3, 2019, now abandoned, which is a continuation of application No. 16/241,803, filed on Jan. 7, 2019, now abandoned, which is a continuation of application No. 16/052,509, filed on Aug. 1, 2018, now abandoned, which is a continuation-in-part of application No. PCT/US2017/016103, filed on Feb. 1, 2017.

(60) Provisional application No. 62/289,862, filed on Feb. 1, 2016.

(51) Int. Cl.
*G01G 19/02* (2006.01)
*G01G 19/08* (2006.01)
*G01L 5/13* (2006.01)

(56) References Cited

U.S. PATENT DOCUMENTS

| | | | |
|---|---|---|---|
| D255,664 S | 7/1980 | Wahl | |
| 5,149,121 A * | 9/1992 | Hafner | B60D 1/248 280/446.1 |
| 5,497,669 A | 3/1996 | Hafner | |
| 6,053,521 A | 4/2000 | Schertler | |
| 6,494,478 B1 * | 12/2002 | MacKarvich | B60D 1/06 280/483 |
| 6,722,684 B1 * | 4/2004 | McAllister | B60D 1/06 280/483 |
| 6,840,541 B2 | 1/2005 | Walters | |
| 6,956,468 B2 | 10/2005 | Lee et al. | |
| 7,960,659 B2 | 6/2011 | Cleary | |
| 8,393,632 B2 | 3/2013 | Vortmeyer et al. | |
| 9,004,523 B2 | 4/2015 | Scharf | |
| 9,327,566 B2 | 5/2016 | McAllister | |
| 9,643,462 B2 | 5/2017 | McAllister | |
| 9,796,227 B2 | 10/2017 | McAllister | |
| 10,106,002 B2 | 10/2018 | McAllister | |
| 10,596,869 B2 | 3/2020 | McAllister | |
| 2006/0032679 A1 | 2/2006 | Wilson et al. | |
| 2006/0290102 A1 * | 12/2006 | VanBuskirk | B60D 1/62 280/511 |
| 2009/0079164 A1 | 3/2009 | Columbia | |
| 2011/0259651 A1 | 10/2011 | Cleary | |
| 2012/0217726 A1 | 8/2012 | Vortmeyer et al. | |
| 2013/0253814 A1 | 9/2013 | Wirthlin | |
| 2014/0110918 A1 | 4/2014 | McCoy | |
| 2015/0069737 A1 | 3/2015 | McAllister | |
| 2015/0306929 A1 | 10/2015 | McAllister | |
| 2016/0185170 A1 | 6/2016 | McAllister | |
| 2017/0021684 A1 | 1/2017 | McAllister | |
| 2018/0001720 A1 | 1/2018 | McAllister | |
| 2018/0297427 A1 | 10/2018 | McAllister | |

FOREIGN PATENT DOCUMENTS

| | | |
|---|---|---|
| GB | 2288776 | 1/1995 |
| WO | WO2009058922 | 5/2009 |

OTHER PUBLICATIONS

Sherline Trailer Tongue Weight Scale—https://www.sherline.com/product/sherline-trailer-tongue-weight-scale, at least as early as Feb. 1, 2017.

Trailer-Hitch WeighSafe Scale Makes Towing Safer—http://www.forconstructionpros.com/news/11245476/trailer-hitch-weighsafe-scale-makes-towing-safer, at least as early as Feb. 7, 2016.

Trailer Tongue-Weight Hitch Shank Medium Duty Work Truck Info Bruce Smith Nov. 7, 2013—http://www.hardworkingtrucks.com/trailer-tongue-weight-hitch-shank, at least as early as Feb. 7, 2016.

Weigh Safe 2-Ball Mount w/Built-in Scale—2" Hitch—6" Drop, 7" Rise—10K Weigh Safe Ball Mounts WS6-2—http://www.etrailer.com/ball-mounts/weigh-safe/ws6-2.html, at least as early as Feb. 7, 2016.

* cited by examiner

TRAILER HITCH SYSTEM WITH SCALE BALL MOUNT

CROSS-REFERENCE TO RELATED APPLICATIONS

This application is a continuation of U.S. patent application Ser. No. 16/681,654, filed Nov. 12, 2019, which is a continuation of U.S. patent application Ser. No. 16/430,213, filed Jun. 3, 2019, which is a continuation of U.S. patent application Ser. No. 16/241,803, filed Jan. 7, 2019, which is a continuation of U.S. patent application Ser. No. 16/052,509, filed Aug. 1, 2018, which is a continuation-in-part of PCT International Application No. PCT/US17/16103, filed on Feb. 1, 2017, which claims the benefit of Provisional U.S. Patent Application No. 62/289,862, filed on Feb. 1, 2016, all of which are hereby incorporated by reference herein in their entirety, including but not limited to those portions that specifically appear hereinafter, the incorporation by reference being made with the following exception: in the event that any portion of the above-referenced applications are inconsistent with this application, this application supersedes said above-referenced applications.

STATEMENT REGARDING FEDERALLY SPONSORED RESEARCH OR DEVELOPMENT

Not Applicable.

BACKGROUND

1. The Field of the Present Disclosure

The present disclosure relates generally to trailer hitches, and more particularly, but not necessarily entirely, to trailer hitch systems for measuring tongue weight of a trailer.

2. Description of Related Art

Trailer hitches are utilized to couple tow vehicles and trailers. In a standard configuration, a trailer hitch may comprise a receiver permanently mounted to the undercarriage of the tow vehicle. A ball mount may include a shank portion configured and adapted to be installed in the receiver. The ball mount may further include a bore for a shaft of a hitch ball. Conventional ball mounts may include a fixed drop portion for providing a height difference between the receiver and the hitch ball. It will be appreciated that the height difference between the hitch ball and the receiver, referred to as drop, may be necessary for safe towing as the trailer should always be as level as possible. Accordingly, ball mounts have been constructed with a variable drop. In particular, the hitches may include a drop bar having a plurality discrete mounting locations for a ball support member. The ball support member may be selectively secured to any one of the plurality of discrete mounting locations using a manual or integrated pin.

It will also be appreciated that the correct balance of a trailer load is necessary for safe towing. Despite the advantages of the known trailer hitches, improvements are still being sought. The prior art is characterized by several disadvantages that may be addressed by the present disclosure. The present disclosure minimizes, and in some aspects eliminates, the failures of the prior art, by utilizing the system and components described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
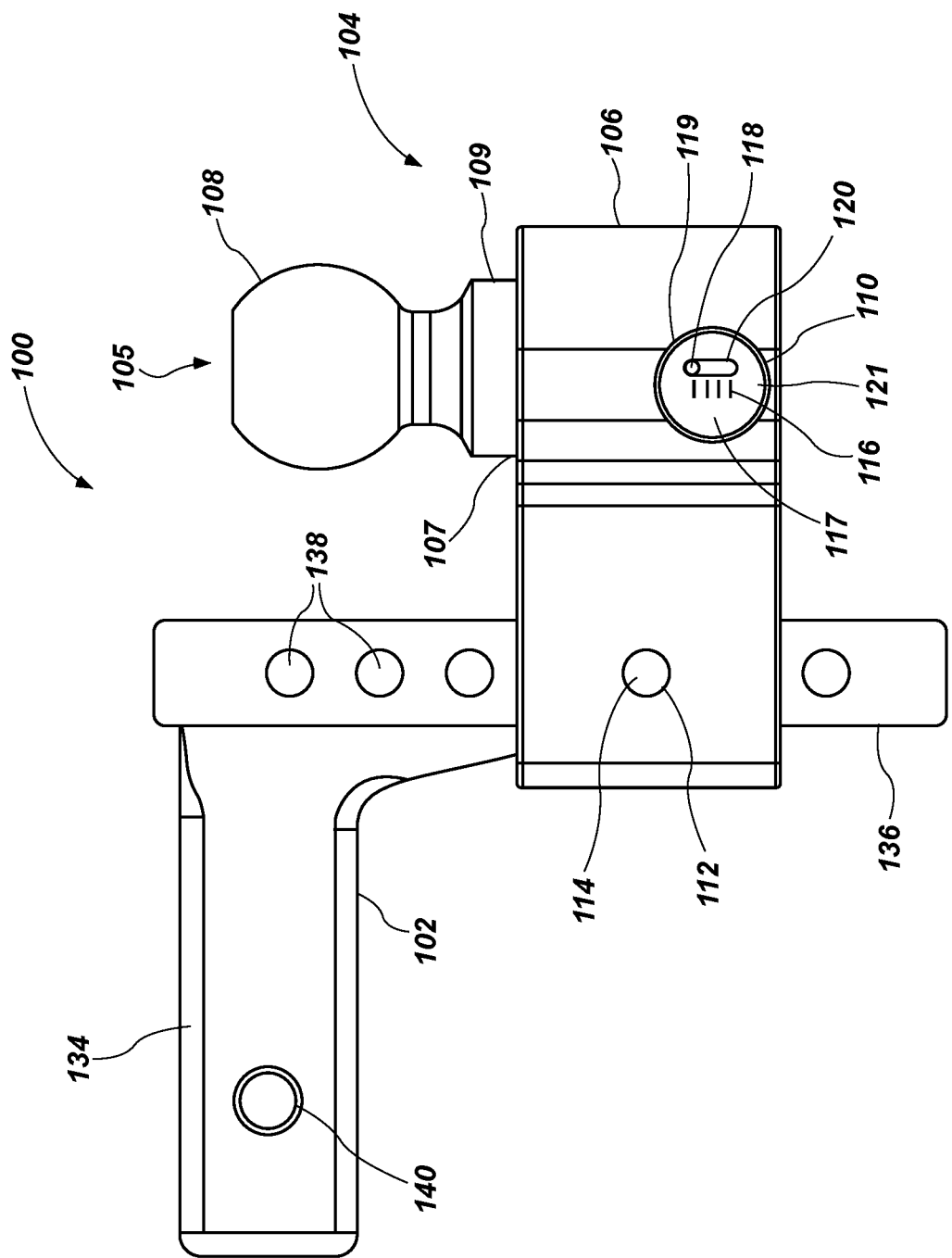
FIG. 1 is a side view of an example of a trailer hitch system according to the present disclosure.
Figure 2:
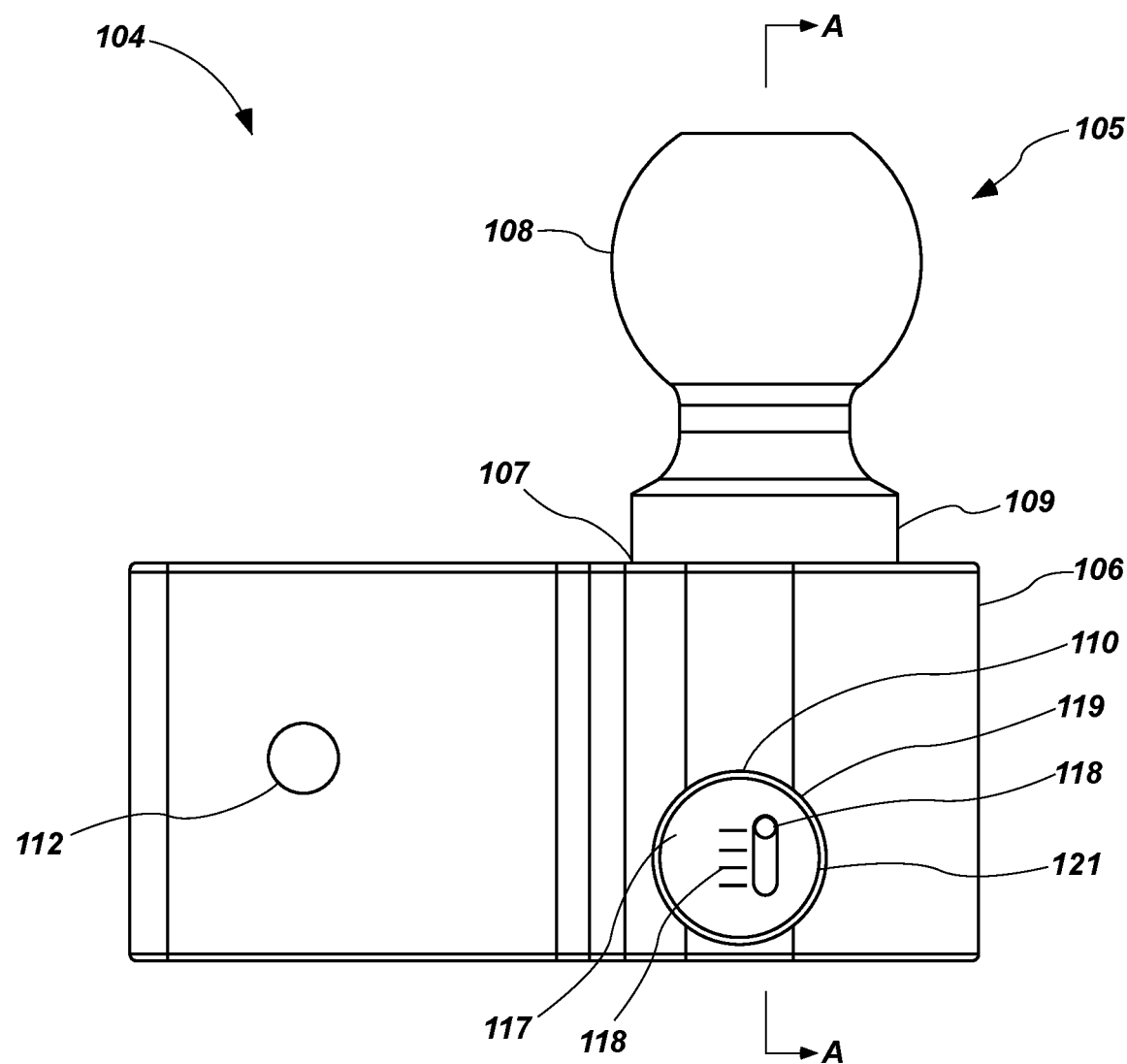
FIG. 2 is a side view of an example of a scale ball mount of the trailer hitch system of FIG. 1.
Figure 3:
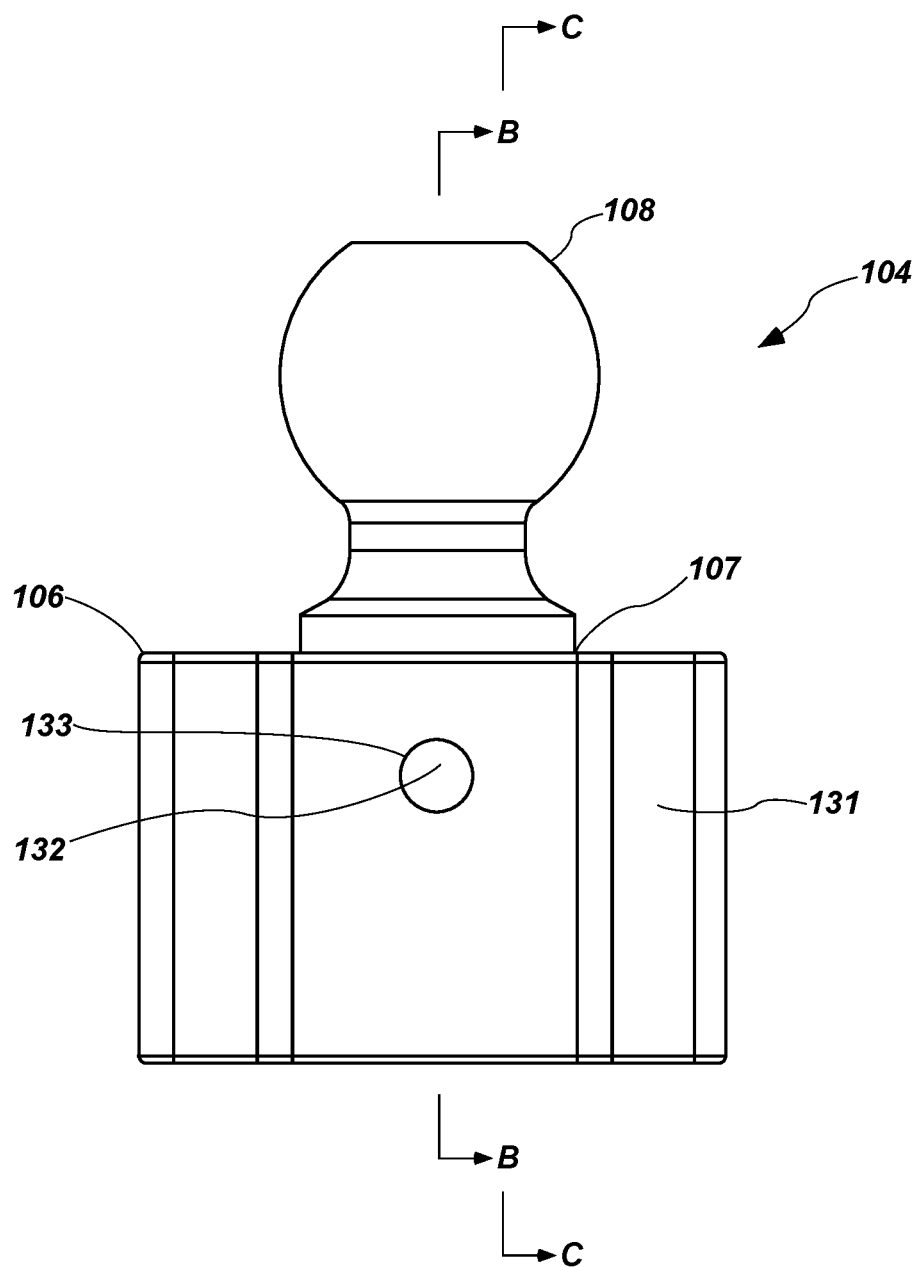
FIG. 3 is a front view of the scale ball mount of FIG. 2.
Figure 4:
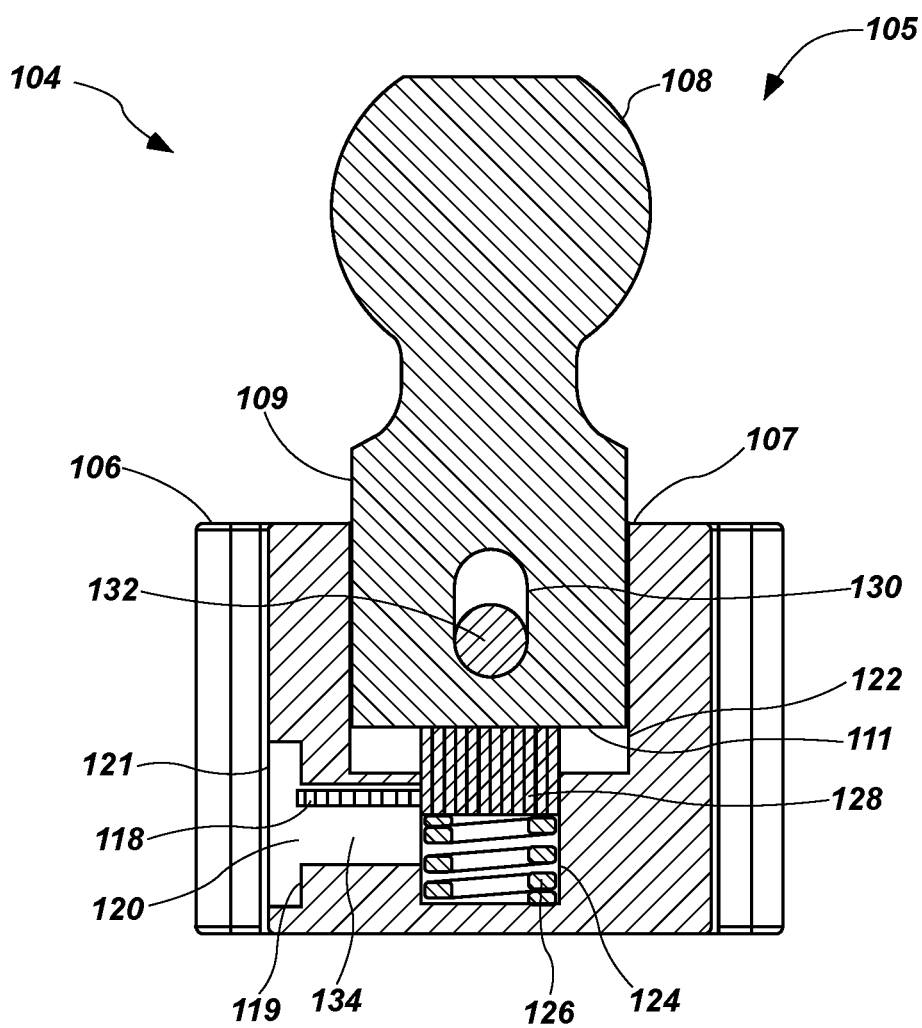
FIG. 4 is a cross-sectional view taken along line A-A of the scale ball mount of FIG. 2.
Figure 5:
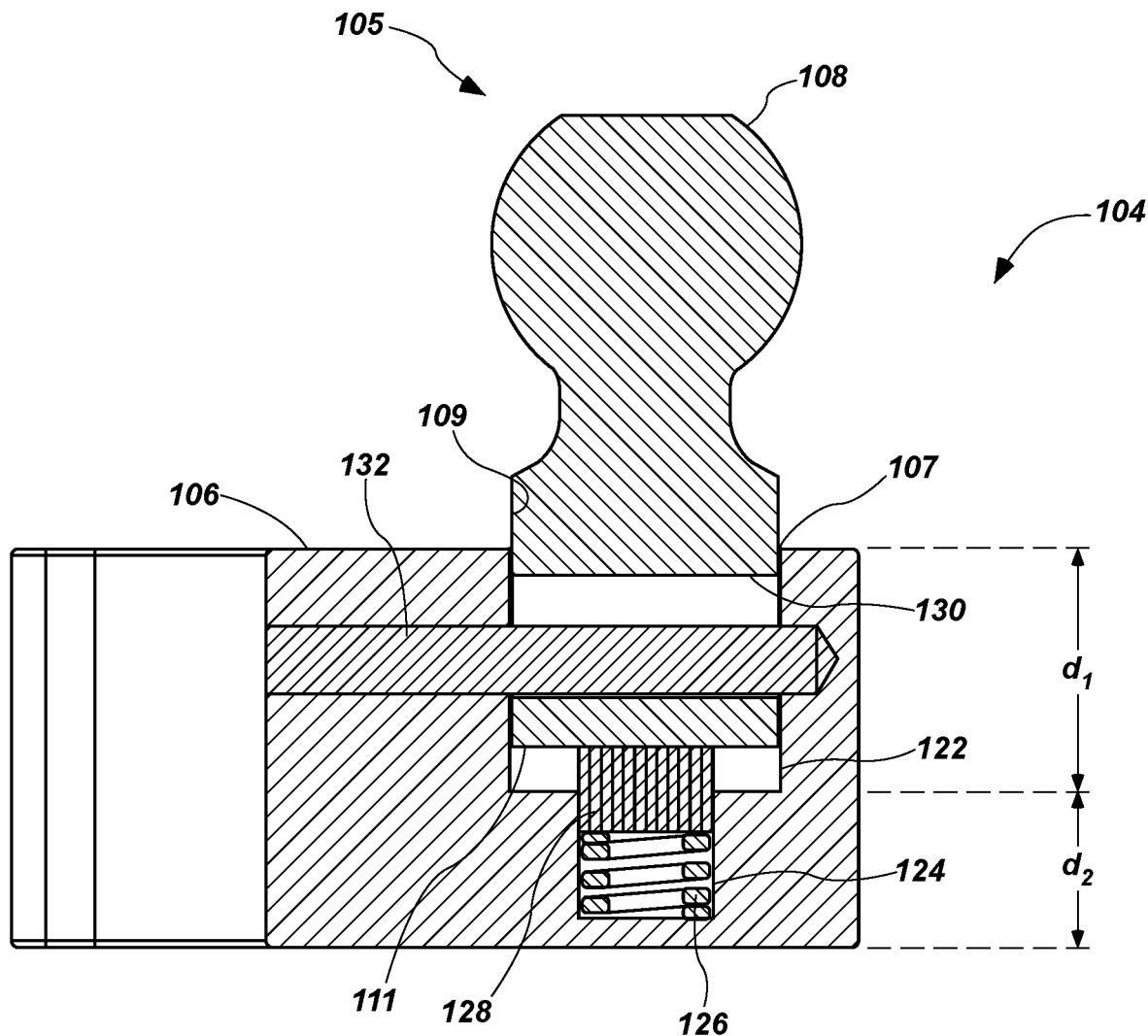
FIG. 5 is a cross-sectional view taken along line B-B of the scale ball mount of FIG. 3.
Figure 6:
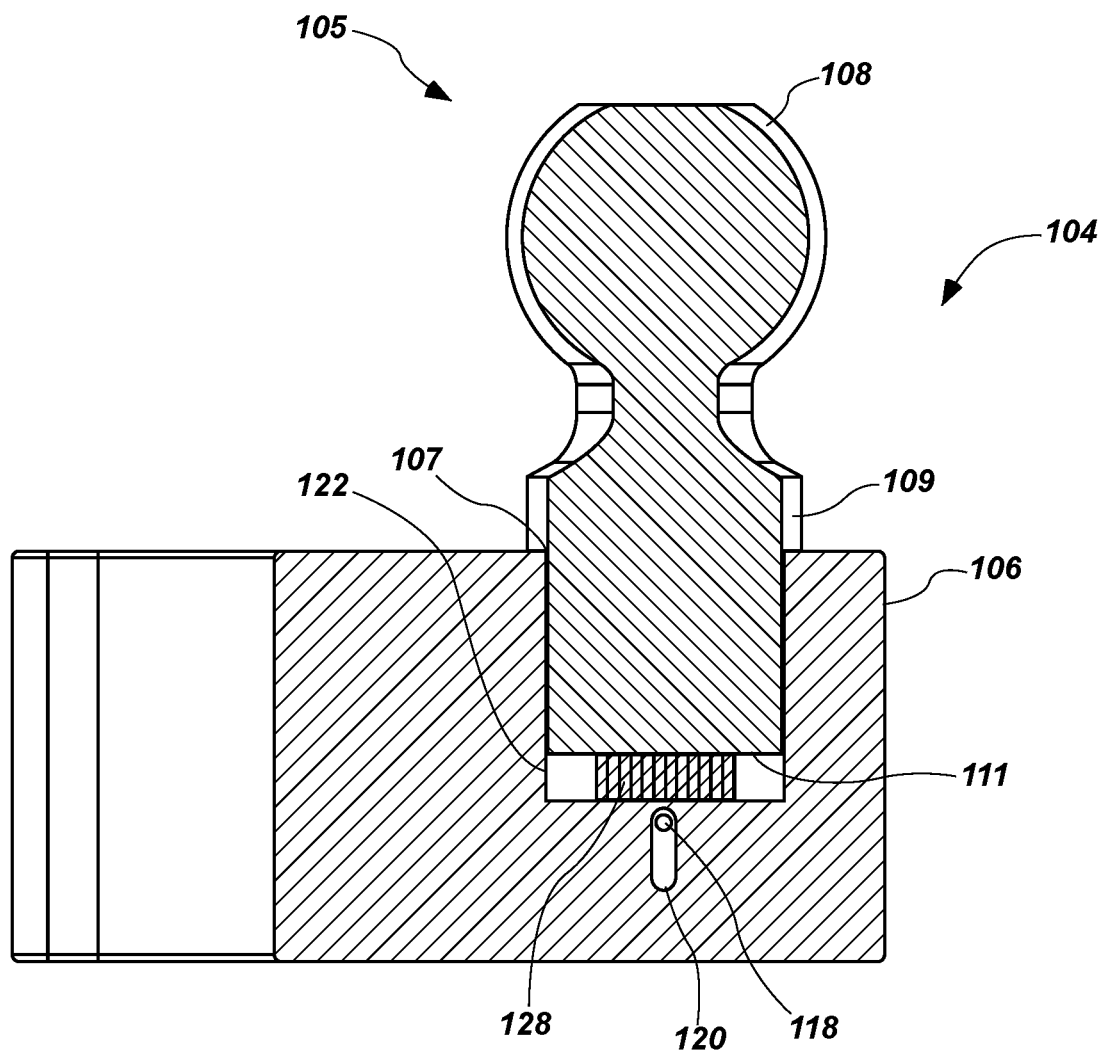
FIG. 6 is a cross-sectional view taken along line C-C of the scale ball mount of FIG. 3.
Figure 7:
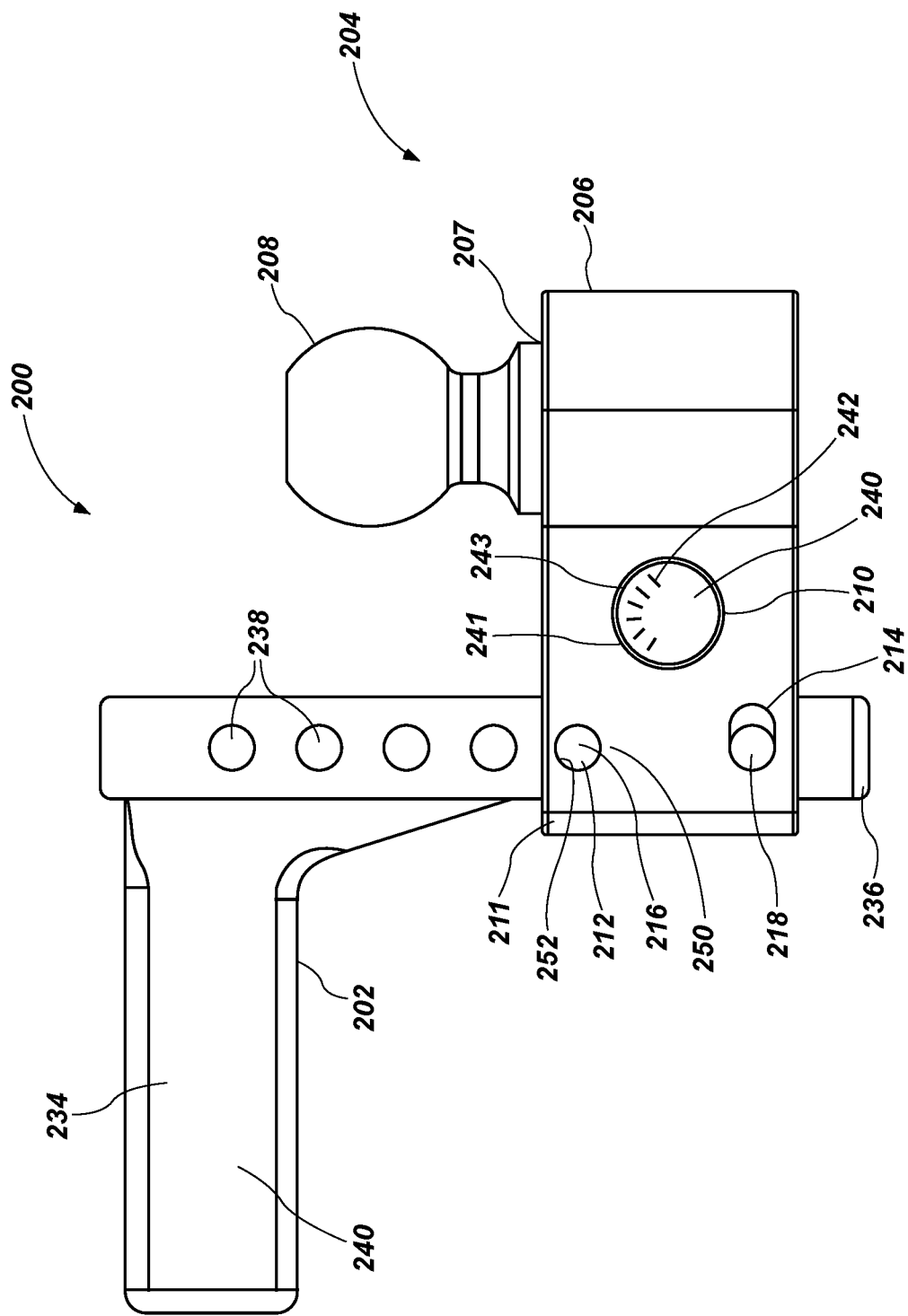
FIG. 7 is a side view of an example of a trailer hitch system according to an embodiment of the present disclosure.
Figure 8:
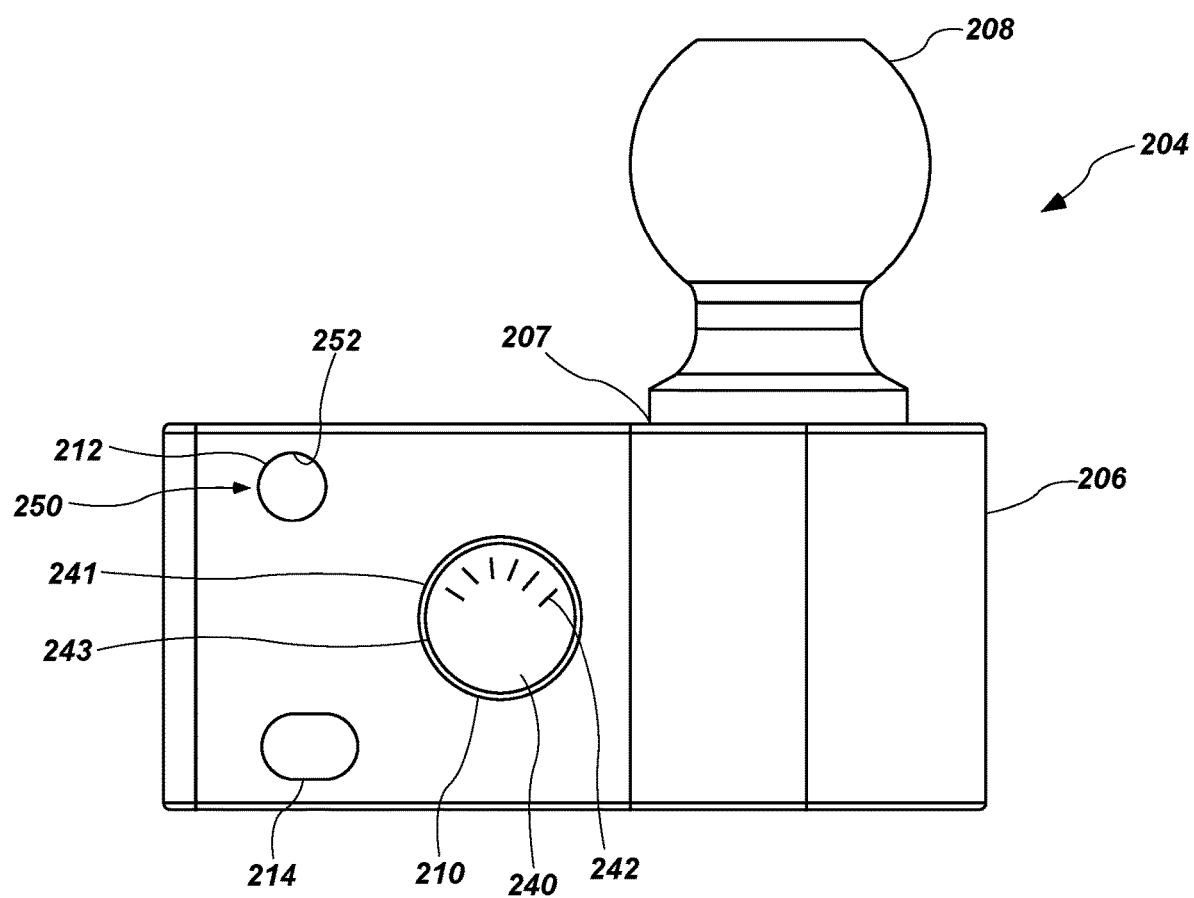
FIG. 8 is a side view of an example of a scale ball mount of the trailer hitch system of FIG. 7.
Figure 9:
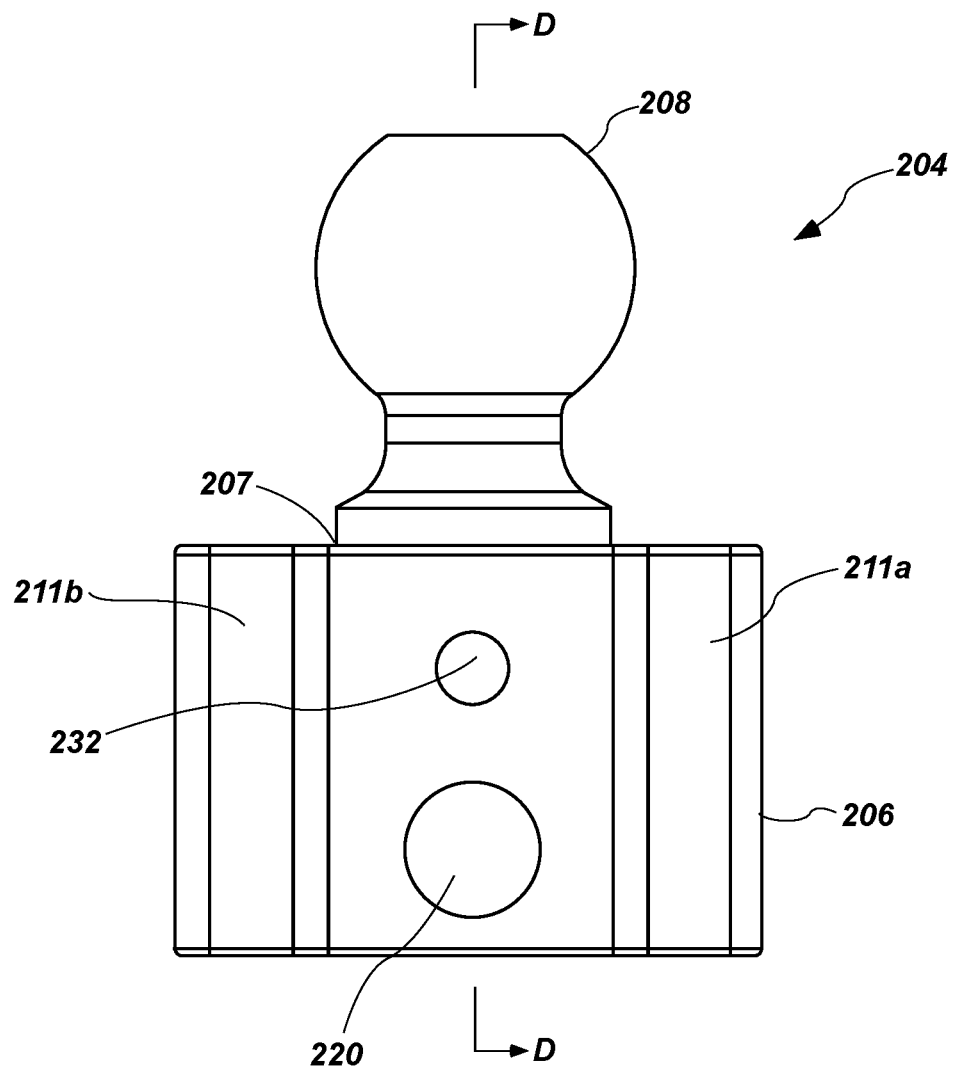
FIG. 9 is a is a front view of the scale ball mount of FIG. 7.
Figure 10:
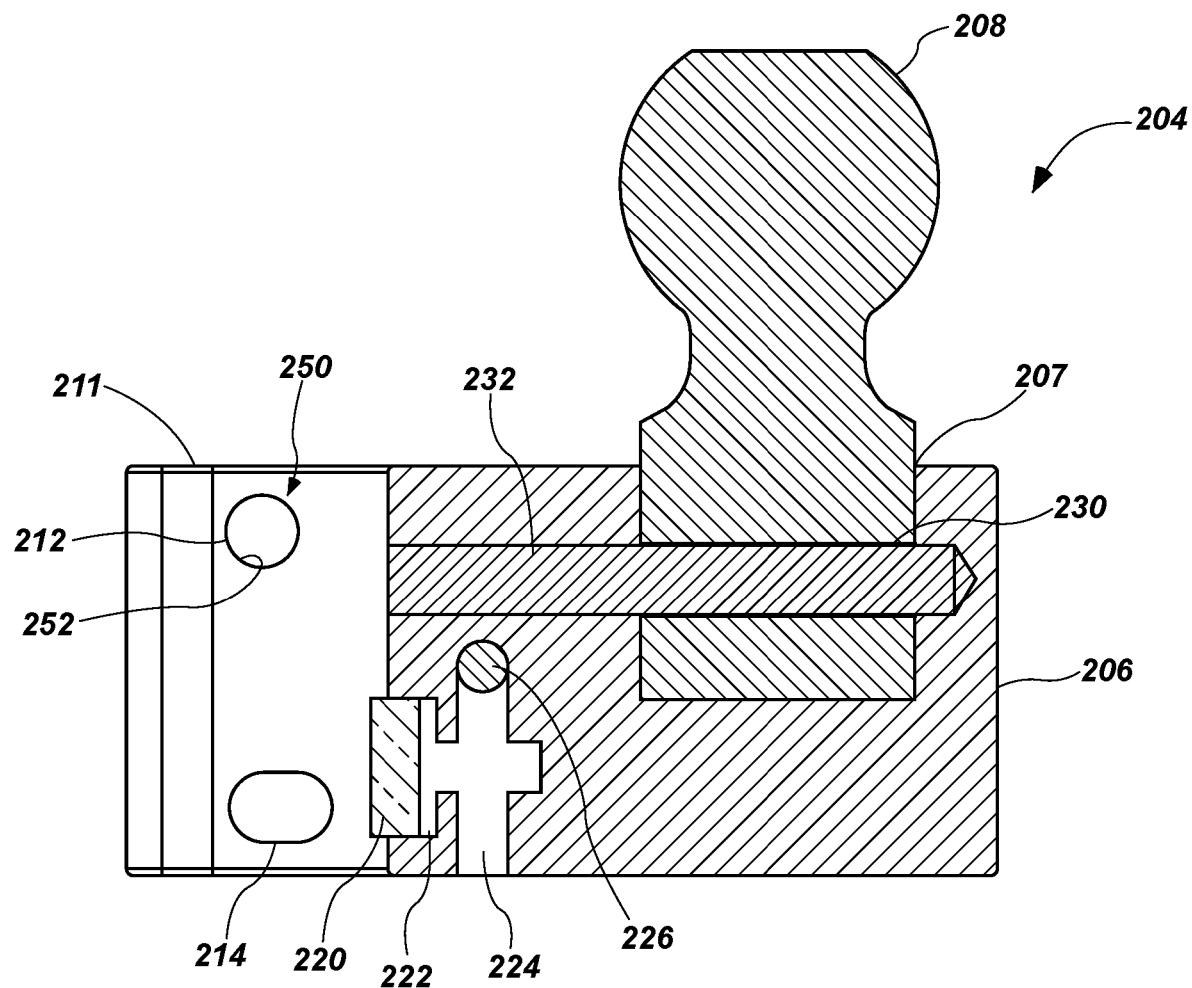
FIG. 10 cross-sectional view taken along line D-D of the scale ball mount of FIG. 9.
Figure 11:
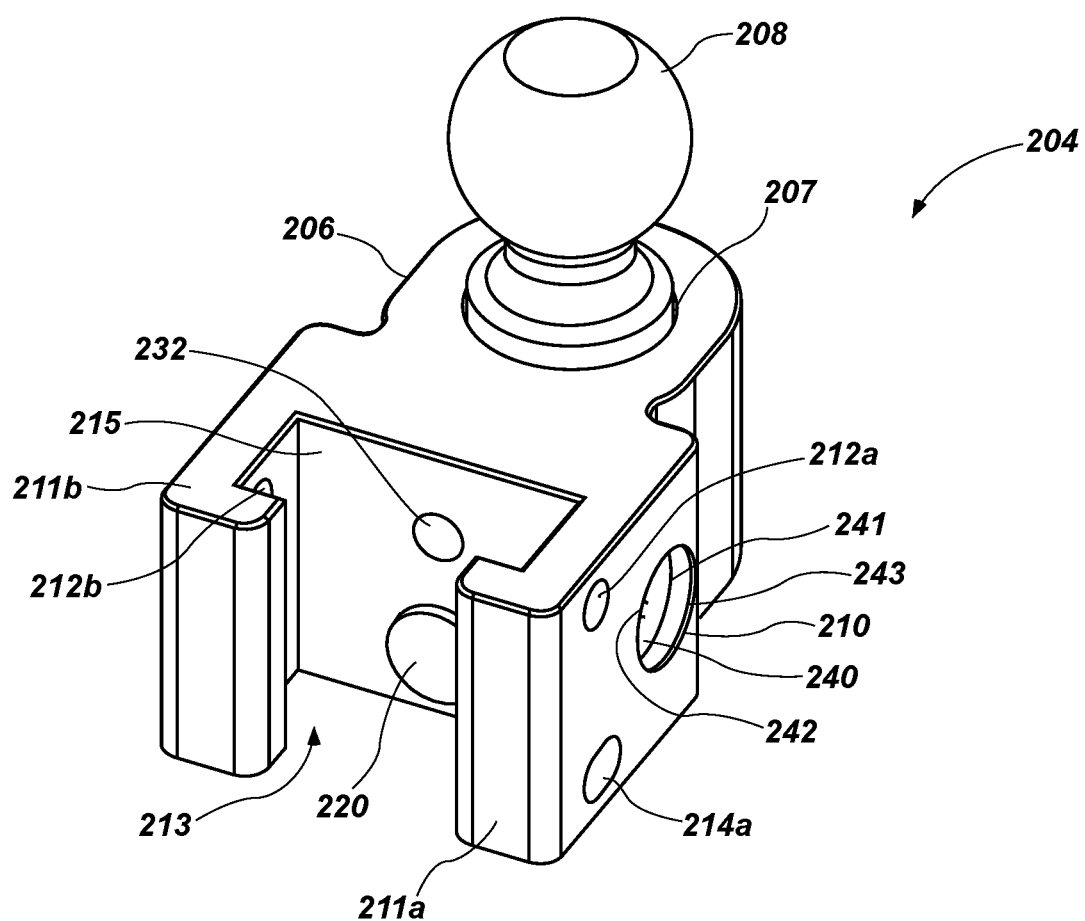
FIG. 11 is a front perspective view of the scale ball mount of FIG. 7.
Figure 12:
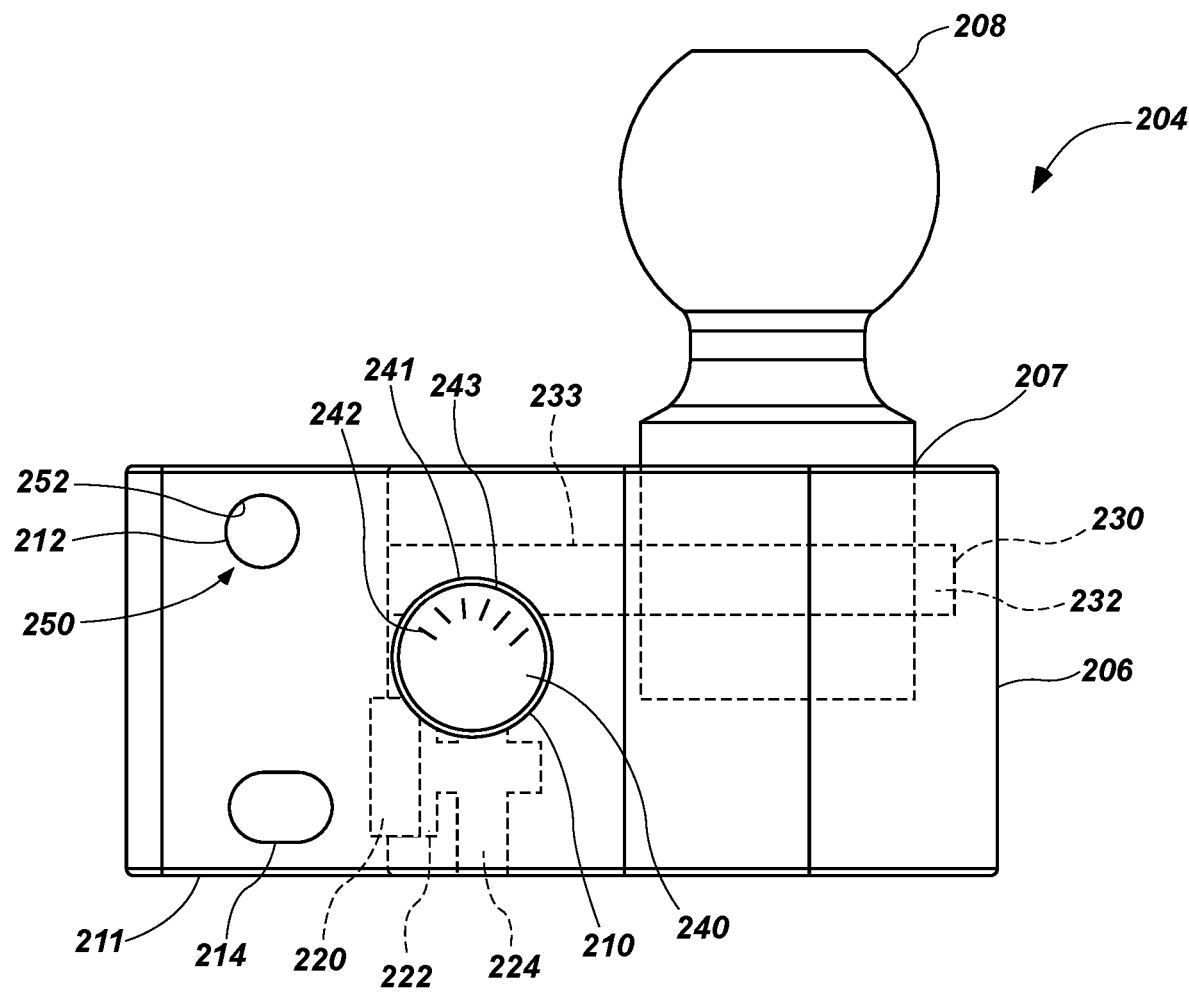
FIG. 12 is a detailed side view of the scale ball mount of FIG. 7.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Applicant has discovered an improved trailer hitch system that may reduce or completely prevent certain unsafe trailer towing conditions. In an embodiment, the applicant's trailer hitch system may include a scale ball mount or ball support member for measuring the tongue weight of a trailer. The tongue weight of a trailer is the weight or static force that the trailer tongue exerts on the trailer hitch ball. An insufficient tongue weight may cause a trailer to be susceptible to swaying side to side, creating dangerous towing conditions. An overloaded tongue weight, or a tongue weight that is too great for the load of a trailer, may cause the towing vehicle to become off balanced due to the overload at the rear tires. Too much weight at the tongue of a trailer can cause erratic and dangerous towing conditions, including uncontrollable movements of the rear tires and improper handling and stopping abilities due to the lack of traction at the front tires.

The generally accepted proper tongue weight is roughly 10 to 15 percent of the total loaded trailer weight. For instance, if a loaded trailer has a weight of 2000 pounds, the proper tongue weight would be between 200 and 250 pounds. Anything below 200 or above 250 pounds may cause the unsafe conditions described above. As such, the load of a trailer should be properly balanced to achieve a tongue weight within the proper tongue weight range, or safe range. Applicant has discovered that providing a simple means for measuring the tongue weight, integrated with a trailer hitch system, can greatly reduce unsafe towing by providing users an effective means for measuring tongue weight and properly balancing the load of the trailer.

Applicant has invented a trailer hitch system which may include a scale ball mount for measuring the tongue weight of a trailer. The scale ball mount may comprise a ball mount, or trailer hitch ball support member, with an integrated scale. The scale ball mount may comprise a trailer hitch ball installed in the ball mount. In an embodiment, the ball mount may include a biasing component disposed below the hitch ball, and a displacement gauge for displaying the downward displacement of the hitch ball and the corresponding trailer tongue weight. In another embodiment, the ball mount may include a plunger configured and dimensioned to contact a drop bar about which the ball mount rotates, the plunger in fluid communication with a readout for displaying a trailer tongue weight.

Referring now to FIGS. 1-6, there is shown a trailer hitch system 100 according to an embodiment of the present disclosure. The trailer hitch system 100 may include a trailer hitch component 102 for coupling to the equipment of a towing vehicle and a ball mount 104. The ball mount 104 may be a ball support member and may include a body or body member 106. The body 106 may comprise a hitch ball aperture 107 for receiving a trailer hitch ball component 105. The ball mount 104 may also comprise a hitch ball displacement gauge 110, or readout, configured and dimensioned to measure and display the downward displacement of the hitch ball component 105. The hitch ball component 105 may comprise a hitch ball 108 and a hitch ball support member 109. The hitch ball support member 109 may have an undersurface 111 and may be either fixedly attached to the hitch ball 108 or may be unattached to and separate from the hitch ball 108 and disposed in alignment with hitch ball 108 such that the hitch ball support member 109 will be forced downwardly in response to downward displacement of hitch ball 108.

The hitch ball displacement gauge 110 may comprise a graded scale or gradation 116 on a display portion 117 and an indicator pin 118 disposed within an indicator channel 120. Hitch ball displacement gauge 100 may also include a back wall 119 for placement of the display portion 117 and a front cover 121, which may be a plastic cover, and may otherwise be any material that may protect display portion 117, or may otherwise be optional. The gradation 116 may be a series of lines corresponding to numbers or values, whether stated or unstated, for translating the displacement of the indicator pin 118 as shown in the indicator channel 120 into a tongue weight of a trailer. The gradation 116 is just one method of displaying the trailer tongue weight on the displacement gauge. Any other indicator means, including digital rendering of the tongue weight based on the displacement of the hitch ball 105, may be employed to display the trailer tongue weight in response to a displacement of the trailer hitch ball 105. The indicator pin 118 may function in cooperation with other components of the ball mount 104 to display the downward displacement of the hitch ball 105 as discussed in greater detail below.

The ball mount 104 may comprise a first vertical bore 122, or upper vertical bore, which may be disposed in the body 106 of the ball mount 104. First vertical bore 122 may be dimensioned and configured as the hitch ball aperture 107 for receiving the trailer hitch ball 105. Hitch ball aperture 107 may be a hole of any shape, including round, square, rectangular or any other shape, whether polygonal, circular, or otherwise. Accordingly, hitch ball aperture 107 may comprise one or more bores, such as first vertical bore 122, which may comprise any shape, whether circular or otherwise, such as square, rectangular, polygonal, or any other geometric configuration suitable for receiving a trailer hitch ball component 105.

A second vertical bore 124, or lower vertical bore, may also be disposed in the body 106 of the ball mount 104.

Second vertical bore 124 may be configured and dimensioned to receive a biasing component 126. Like first vertical bore 122, second vertical bore may comprise any shape, whether circular or otherwise, such as square, rectangular, polygonal, or any other geometric configuration suitable for receiving a biasing component 126.

First vertical bore 122 may be disposed above second vertical bore 124. Said another way, second vertical bore 124 may disposed below first vertical bore 122. First and second vertical bores 122 and 124 have diameters corresponding with each individual vertical bore, and the diameters of first and second vertical bores 122 and 124 may be different. First vertical bore 122 may be larger, or have a larger diameter, than second vertical bore 124. In another embodiment, first vertical bore 122 and second vertical bore 124 may be substantially the same size, or each have a diameter that is substantially similar to or the same as the other. In such an embodiment, first vertical bore 122 and second vertical bore 124 may form a single, unitary bore. In other embodiments, first and second vertical bores 122 and 124 may form two distinct bores of different diameters.

First vertical bore 122 may have a depth $d_1$ and second vertical bore 124 may have a depth $d_2$. In an embodiment, depth $d_1$ may be substantially the same as depth $d_2$. In yet another embodiment, depth $d_1$ may be greater than depth $d_2$. For example, depth $d_1$ may be two times greater than depth $d_2$ or may be anywhere between 1.1 and 5 times greater than depth $d_2$. The depth of first and second vertical bores 122 and 124 may be especially critical to the design of the ball mount 104 of trailer hitch system 100, as explained in more detail below.

Biasing component 126 may be disposed within second vertical bore 124. Biasing component 126 may be a spring or any other component configured to provide a bias or to provide a compressible force against another body. In an embodiment, a biasing component 126 may be configured and dimensioned to be disposed below the hitch ball 105. Biasing component 126 may contact the hitch ball and oppose a downward displacement of the hitch ball. In an embodiment, the biasing component 126 may be disposed in contact with the undersurface 111 of the hitch ball support member 109, such that downward displacement of the hitch ball component 105 compresses the biasing component 126.

Ball mount 104 may further comprise a spacer 128 disposed between the biasing component 124 and the hitch ball 105. The spacer 128 may comprise a projection 118, which may be a member extending radially from the spacer outward. The projection 118 may be an indicator pin 118. Projection or indicator pin 118 may be disposed in an indicator bore 134. Indicator bore 134 may be disposed between lower bore 124 and displacement gauge 110, which may be disposed on an outside surface of the body 106. In other words, indicator bore 134 may be transverse to lower bore 124 and may run from lower bore 124 to an outside surface of the body 106 where displacement gauge 110 may be located.

As explained above, indicator pin 118 may cooperate with hitch ball displacement gauge 110 to display the downward displacement of the hitch ball. As the hitch ball 105 receives a load and pushes against the biasing component 126, spacer 128 and projection or indicator pin 118 will move downward as the hitch ball 105 moves downward. The displacement of the hitch ball 105, and the corresponding displacement of the spacer 128 and indicator pin 118, will be displayed through the indicator channel 120 on the display component 116 of the displacement gauge 110.

Second or lower vertical bore 124 may be completely shut off from all other components of trailer hitch system 100, with the exception of first or upper vertical bore 124 and indicator bore 134. In other words, lower vertical bore 124 may be enclosed in body 106, having fluidic communication only with upper vertical bore 124 and indicator bore 134. The enclosure of lower vertical bore 124 may serve a variety of benefits, including protecting biasing component 126 from contamination and interference that dirt or other particles may cause. In other words the lower vertical bore 124 may open only to the upper vertical bore 122 and a single transverse bore, such as indicator bore 134.

It will be appreciated that displacement gauge 110 may be calibrated based on the resistance of biasing component 126 such that the displacement of the ball hitch 105, and subsequent displacement of the spacer 128 as revealed by indicator pin 118 through the indicator channel 120 of the displacement gauge 110, may represent the static force applied to the hitch ball 105. The static force applied to the hitch ball may also be referred to as the tongue weight of the trailer coupled to the hitch ball. With the displacement gauge 110 calibrated, the display component 116 of the displacement gauge 110 may include a scale or other means for translating the degree of displacement of the indicator pin to the amount of the trailer tongue weight.

Hitch ball 105 may comprise a transverse ball bore 130 for receiving a hitch ball pin 132. Transverse ball bore 130 may be disposed on a base portion of hitch ball 105, or any portion of hitch ball 105 that may be contained within ball mount 104. Ball mount 104 may comprise a transverse ball pin bore 133 corresponding to transverse ball bore 130. Transverse ball pin bore 133 may be disposed transverse of upper bore 122, and may be disposed between upper bore 122 and a front face 131 of body member 106. Transverse ball pin bore 133 may be configured and dimensioned to receive the ball pin 132. Said another way, ball pin 132 may be disposed within the ball holder and within the transverse bore in the hitch ball. Transverse ball bore 130 may be obround in order to allow hitch ball 105 to be displaced vertically. The obround or oval-shaped nature of transverse ball bore 130 functions to allow the hitch ball 105 to move freely against the biasing component 126 while securely holding the hitch ball 105 in place within the ball mount 104.

Ball mount 104 may also comprise one or more pin bores 112. Pin bore 112 may be configured and dimensioned to receive a pin 114. Pin bore 112 and pin 114 may be configured and dimensioned to cooperate with a plurality of pin receiving locations 138 on the trailer hitch component 102. Trailer hitch component 102 may comprise a shank 134, which may be configured and adapted to be installed into a hitch receiver of a tow vehicle. Disposed on an end of the shank 134, a drop bar 136 may extend downwardly from the shank. The plurality of pin receiving locations 138 may be disposed in drop bar 136, and may be bores through the drop bar 136 such that the pin 114 may extend from one side of the drop bar 136 to another.

Ball mount 104 may be adjustably engaged with the drop bar. As described above, the one or more pin bores 112 may correspond to one or more of the plurality of pin receiving locations 138 disposed on drop bar 136.

As described above in detail, the components of ball mount 104 may be specifically designed and selected to meet specific requirements critical to the successful operation of trailer hitch system 100.

FIGS. 7-12 show another embodiment of a trailer hitch system 200 according to the present disclosure. Trailer hitch system 200 may comprise trailer hitch component 202 for coupling to the equipment of a towing vehicle and a ball mount 204. The ball mount 204 may be a ball support member and may include a body or body member 206. The body 206 may comprise a hitch ball aperture 207 for receiving a trailer hitch ball 208. The ball mount 204 may also comprise a dial 210, or readout. The dial 210 may comprise a graded scale or gradation 242 on an display component 240 for displaying the tongue weight of the trailer. The gradation 242 may be a series of lines corresponding to numbers or values, whether stated or unstated, for indicating the trailer tongue weight, or may take any other form suitable for displaying the trailer tongue weight. The display component 240 may comprise any other means for indicating the tongue weight of a trailer, including a digital rendering of the trailer weight.

The body 206 of the ball mount 204 may comprise a pair of support arms 211. The pair of support arms 211 may comprise a first support arm 211a and a second support arm 211b, each extending outward or away from the body 206 of the ball mount 204. The pair of support arms 211 may form a slot 213 between the pair of support arms 211. An upper pin bore 212 may be disposed in the pair of support arms 211 and a lower pin bore 214 may also be disposed in the pair of support arms 211. The upper pin bore 212 may be configured and dimensioned to receive an upper pin 216 and the lower pin bore 214 may be configured and dimensioned to receive a lower pin 218.

Upper and lower pin bores 212 and 214 and upper and lower pins 216 and 218 may be configured and dimensioned to cooperate with a plurality of pin receiving locations 238 on the trailer hitch component 202. Trailer hitch component 202 may comprise a shank 234, which may be configured and adapted to be installed into a hitch receiver of a tow vehicle. Disposed on an end of the shank 234, a drop bar 236 may extend downwardly from the shank. The plurality of pin receiving locations 238 may be disposed in drop bar 236, and may be bores through the drop bar 136 such that the upper and lower pins 216 and 218 may extend from one side of the drop bar 136 to another.

Ball mount 204 may be adjustably engaged with the drop bar. As described above, the upper and lower pin bores 212 and 214 may correspond to one or more of the plurality of pin receiving locations 238 disposed on drop bar 236.

Ball mount 204, or ball support member, may be configured to pivot relative to the drop bar 236. Lower pin bore 214 may be obround, which may allow the ball mount 104 to pivot about upper pin 216 disposed in upper pin bore 212 and one of the plurality of pin receiving locations 218 disposed in drop bar 236. In this manner, ball mount 104 may pivot relative to the drop bar 236 when a load is placed on the trailer hitch ball 208 or the ball mount 204.

Ball mount 204, or ball support member, may comprise a pivot point 250. Pivot point 250 may include upper pin bore 212 cooperating with upper pin 216 as described above. Alternatively, pivot point 250 of ball mount 204 may be any point about which ball mount 204 may pivot relative to drop bar 236. Pivot point 250 may be disposed in the upper half of the ball holder, such as above a horizontal plane that passes through the vertical center of the ball holder. In an embodiment, pivot point 250 is internally constrained. Pivot point 250 may be internally constrained by being disposed on an inside surface of the ball holder, such as inside surface 252.

In an embodiment, a load may applied and displacement of the plunger may occur on the same side of the pivot point 250. The trailer tongue weight of the trailer, as described herein, may be a substantially vertical force measured by displacement of the plunger that may be substantially horizontal.

Ball mount 204 may also comprise a plunger 220 disposed in a plunger bore 222. The plunger may include an o-ring (not shown) such that the engagement between the plunger 220 and the plunger bore 222 is fluid-tight, or may cooperate with plunger bore 222 in any other fluid-tight manner. The plunger bore 222 may be disposed in the body 206 of the ball mount 204, and may be disposed on a slot wall 215 within the slot 213 formed between the pair of support arms 211. In an embodiment, plunger bore 222 may extend from slot wall 215 inward of body member 206 such that plunger 220 may sit parallel to slot wall 215.

Plunger 220 may be in fluid communication with the dial 210. Plunger bore 222 may open to a reservoir 224. The reservoir 224 may be filled with a fluid, such as an incompressible fluid or a hydraulic fluid, so that any movement of the plunger 220 causes the fluid to move. Reservoir 224 may include a dial aperture 226. Dial aperture 226 may be disposed at an end of reservoir 224 that is opposite the plunger bore 222. Dial 210 may be installed in dial aperture 226 such that any fluid displaced by plunger 220 enters into dial 210 and produces a readout. In an embodiment, the dial 210 displays the tongue weight of the trailer by way of the gradation 242 on the display component 240. In other embodiments, the display component may comprise any means for indicating the tongue weight of the trailer in response to the displacement of fluid by the plunger 220, including digital rendering of the tongue weight of the trailer.

Reservoir 224 may take any form necessary for facilitating the fluid communication between plunger 220 and dial 210. In an embodiment, reservoir 224 may an aperture in addition to dial aperture 226 and plunger bore 222, which aperture may facilitate the filling of reservoir 224 with fluid. Such an aperture, along with dial aperture 226, may be threaded to allow for a component to be installed. The dial 210 may be installed in dial aperture 226 by way of threads, or any other fluid tight engagement. In another embodiment, the third aperture, which facilitates the filling of the reservoir 224 with fluid, may be capped with a fluid-tight cap, which may employ threads.

It will be appreciated that plunger 220 may be configured and dimensioned to contact the drop bar 236, and that the plunger 220 may be positioned to contact the drop bar 236. As the load of a trailer coupled to the hitch ball 208 is applied to trailer hitch system 200, ball mount 204 will pivot relative to the drop bar 236 about upper pin 212. As ball mount 204 pivots about upper pin 212, the plunger 220 will contact the drop bar 236. The amount of force applied to the hitch ball 208 will be translated to an amount of force applied at the plunger 220. The plunger 220 may translate the force applied at the plunger 220 through the fluid of the reservoir 224, which force may be displayed on the dial 210. Dial 210 may be calibrated to correctly translate the force applied at the plunger 220 to the equivalent static force applied at the trailer hitch ball 208, which is otherwise known as the trailer tongue weight, as described above. The size of plunger 220 and the size of plunger bore 222 relative to the size of reservoir 224 will determine the calibration of the dial 210 based on the amount of fluid that enters dial 210.

In other embodiments, plunger 220 may be disposed in fluid communication with dial 210 by any other means possible. Plunger 220 may measure the force applied at hitch ball 208 by contacting any component of trailer hitch system 200, including shank 134. The various modifications of the present disclosure will be understood to one of ordinary skill in the art.

Hitch ball 208 may comprise a transverse ball bore 230 for receiving a hitch ball pin 232. Transverse ball bore 230 may be disposed on a base portion of hitch ball 208, or any portion of hitch ball 208 that may be contained within ball mount 204. Ball mount 204 may comprise a transverse ball pin bore 233 corresponding to transverse ball bore 230. Transverse ball pin bore 233 may be disposed transverse of hitch ball aperture 207, and may be disposed between hitch ball aperture 207 and slot face 215. Transverse ball pin bore 233 may be configured and dimensioned to receive the ball pin 232. Said another way, ball pin 232 may be disposed within the ball holder and within the transverse bore in the hitch ball. Ball pin 232 prevents hitch ball 208 from being removed from the body 206 of the ball mount 204.

Figure 13:
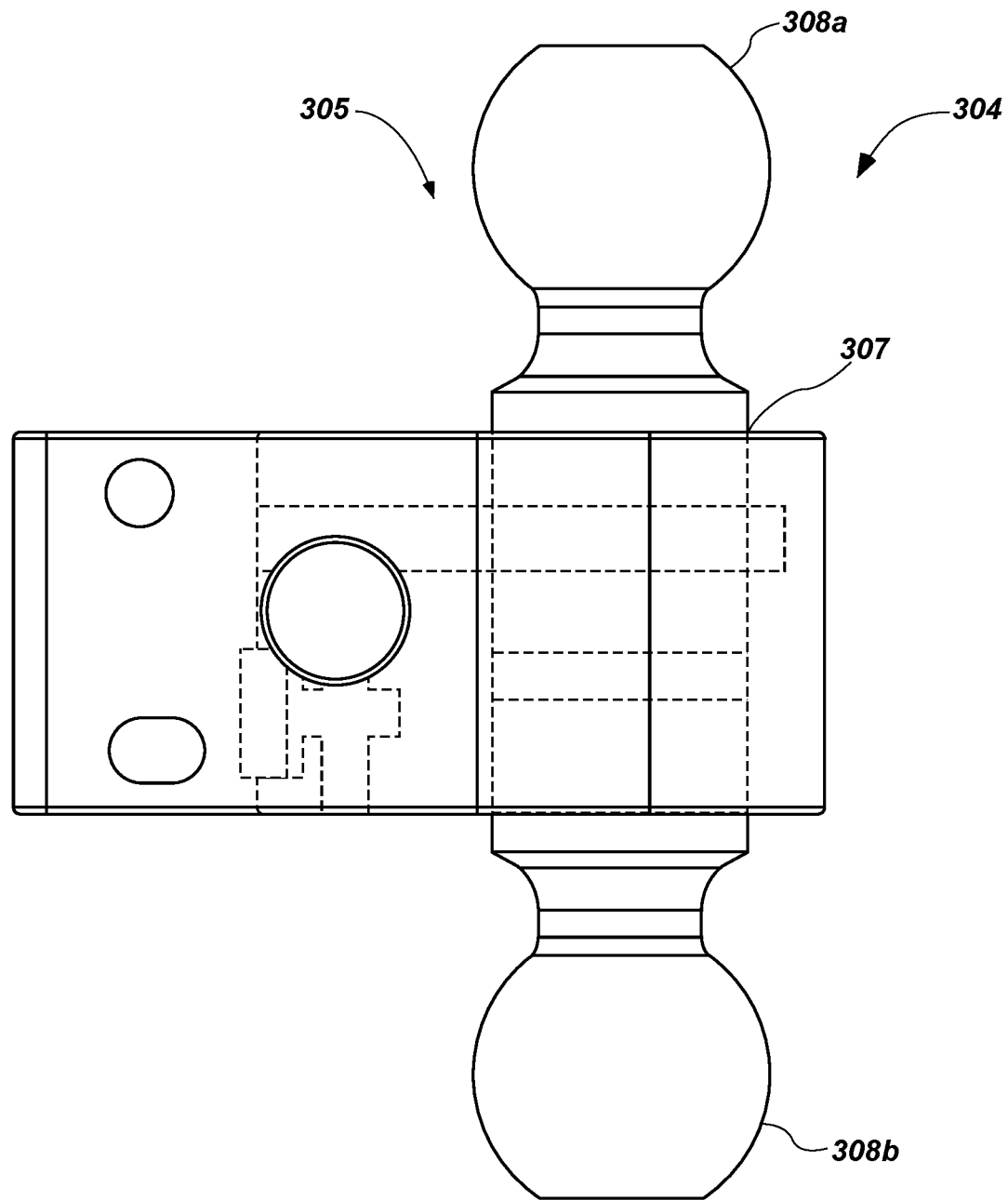
FIG. 13 is a detailed side view of another scale ball mount of a trailer hitch system according to an embodiment of the present disclosure.
Figure 14:
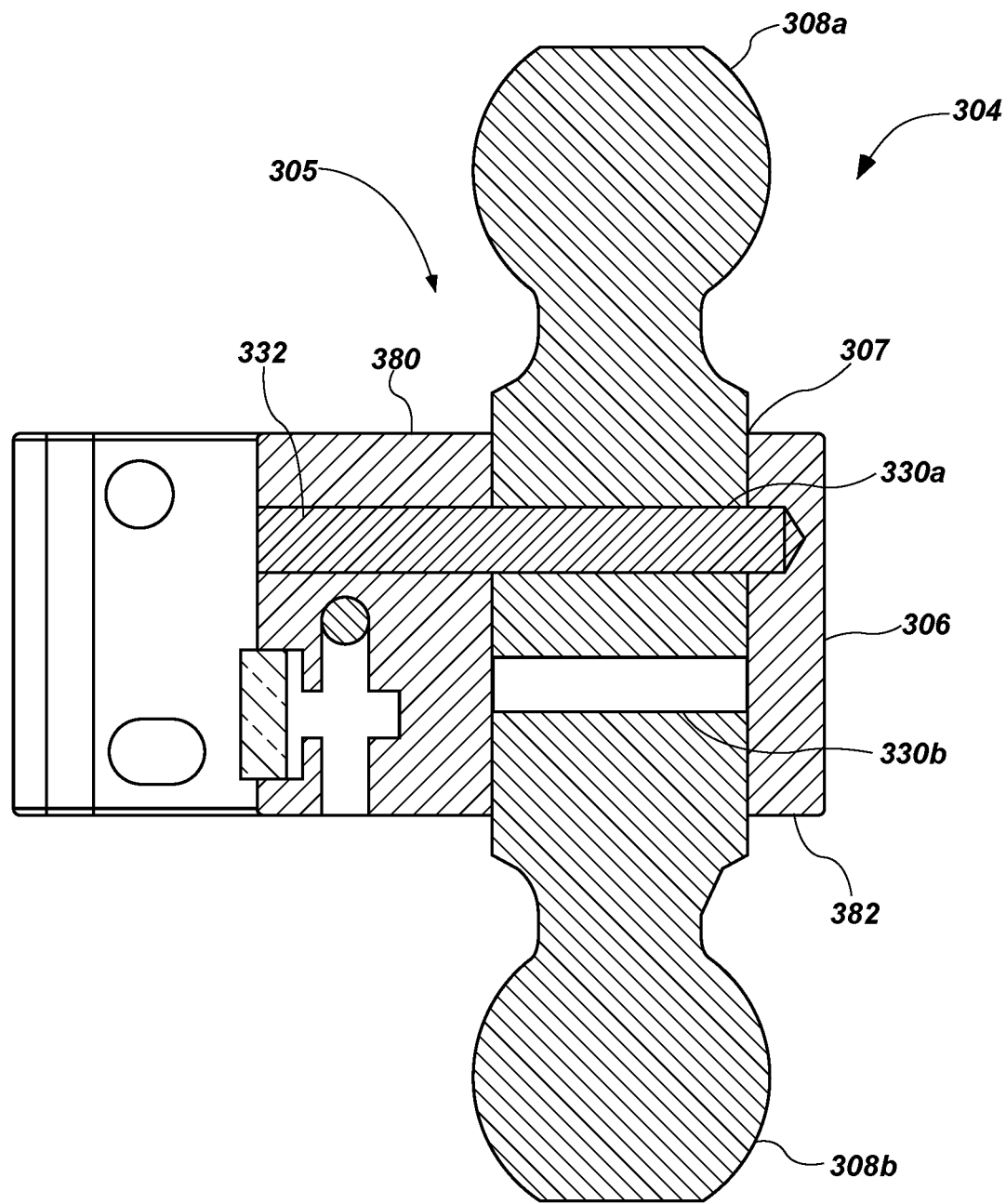
FIG. 14 is a cross-sectional view of the scale ball mount of FIG. 13.
Figure 15:
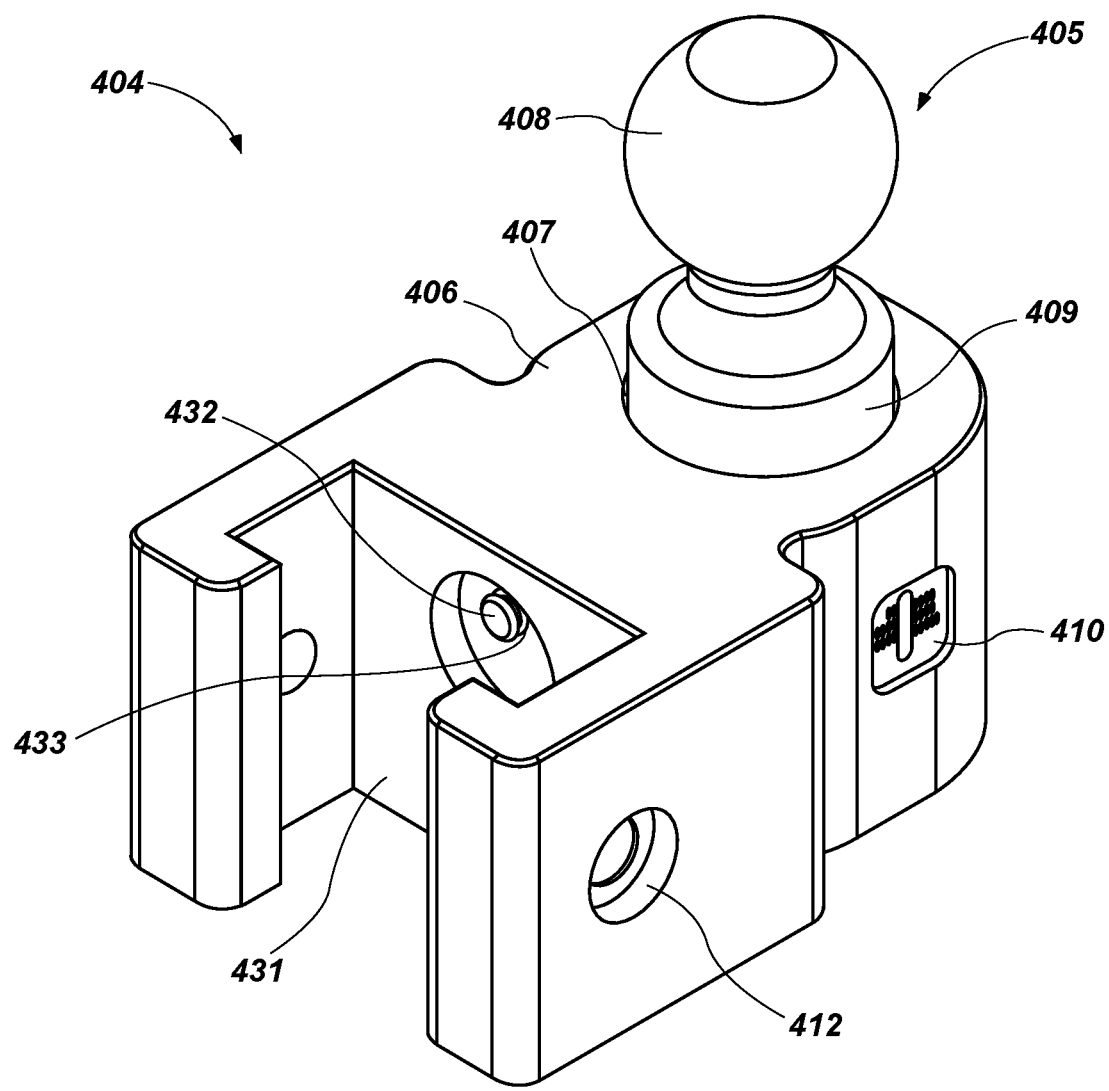
FIG. 15 is a perspective view of another example of a scale ball mount according to an embodiment of the present disclosure.
Figure 16:
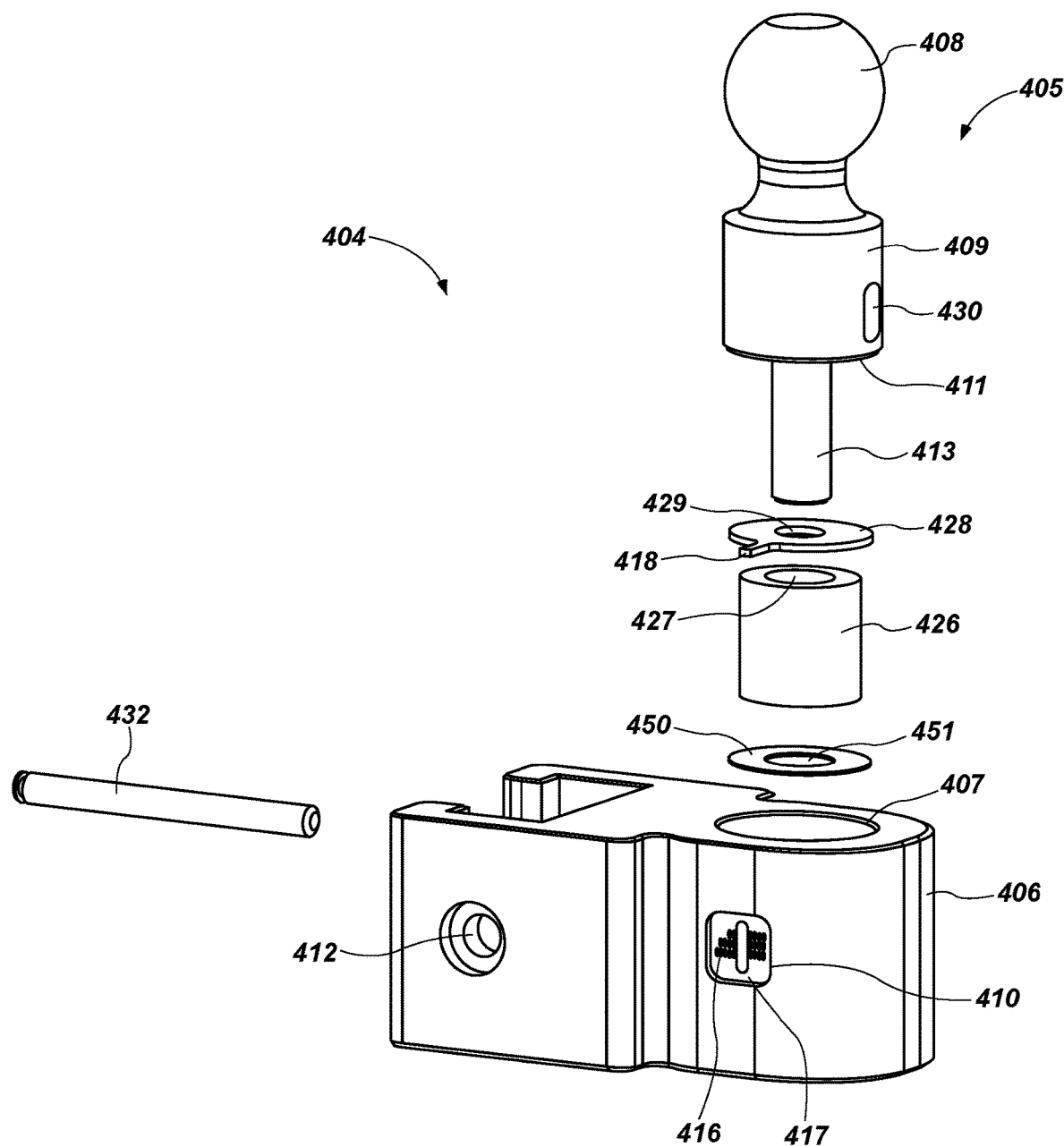
FIG. 16 is an exploded assembly view of the scale ball mount of FIG. 15
Figure 17:
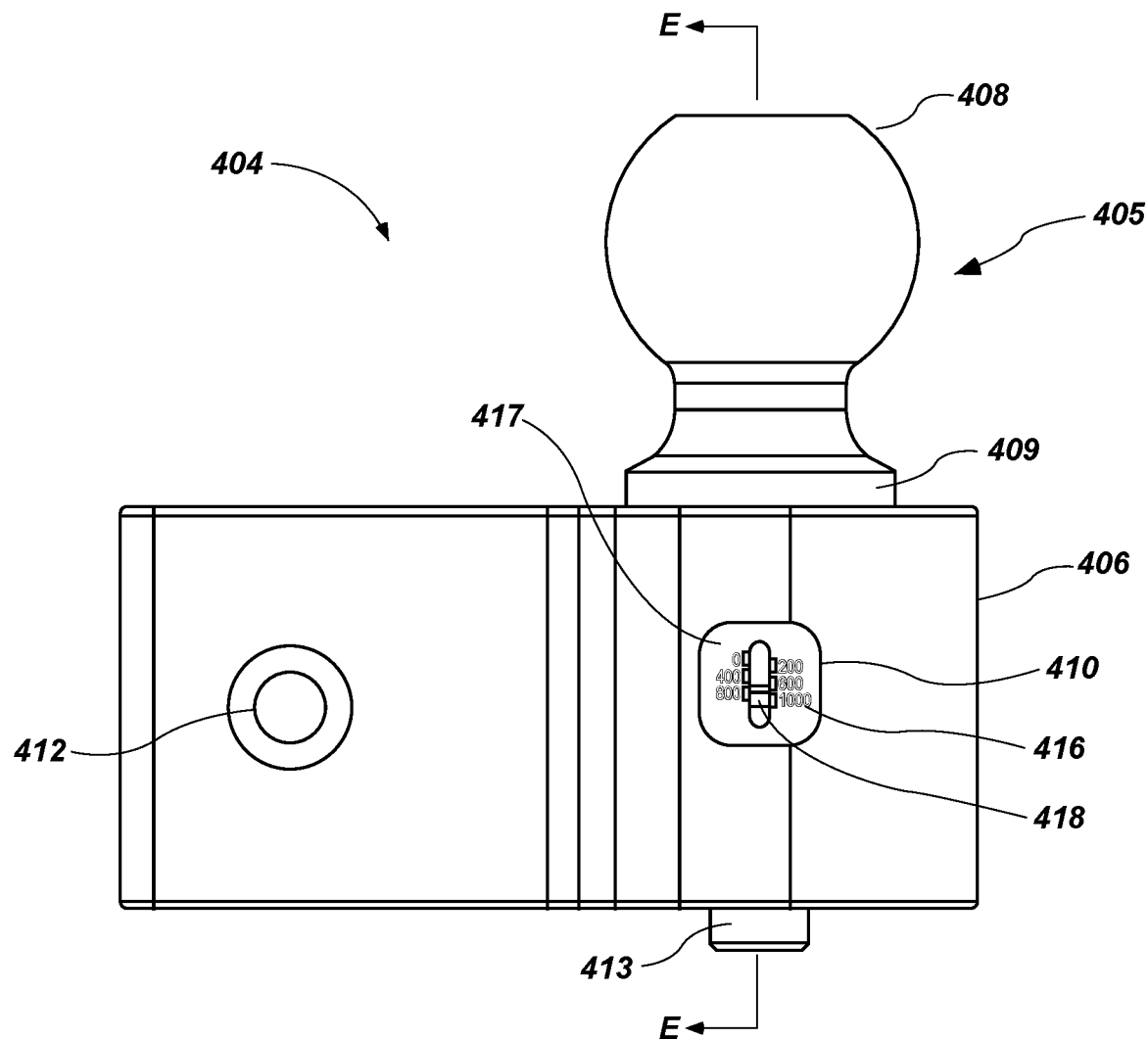
FIG. 17 is a side view of the scale ball mount of FIG. 15.
Figure 18:
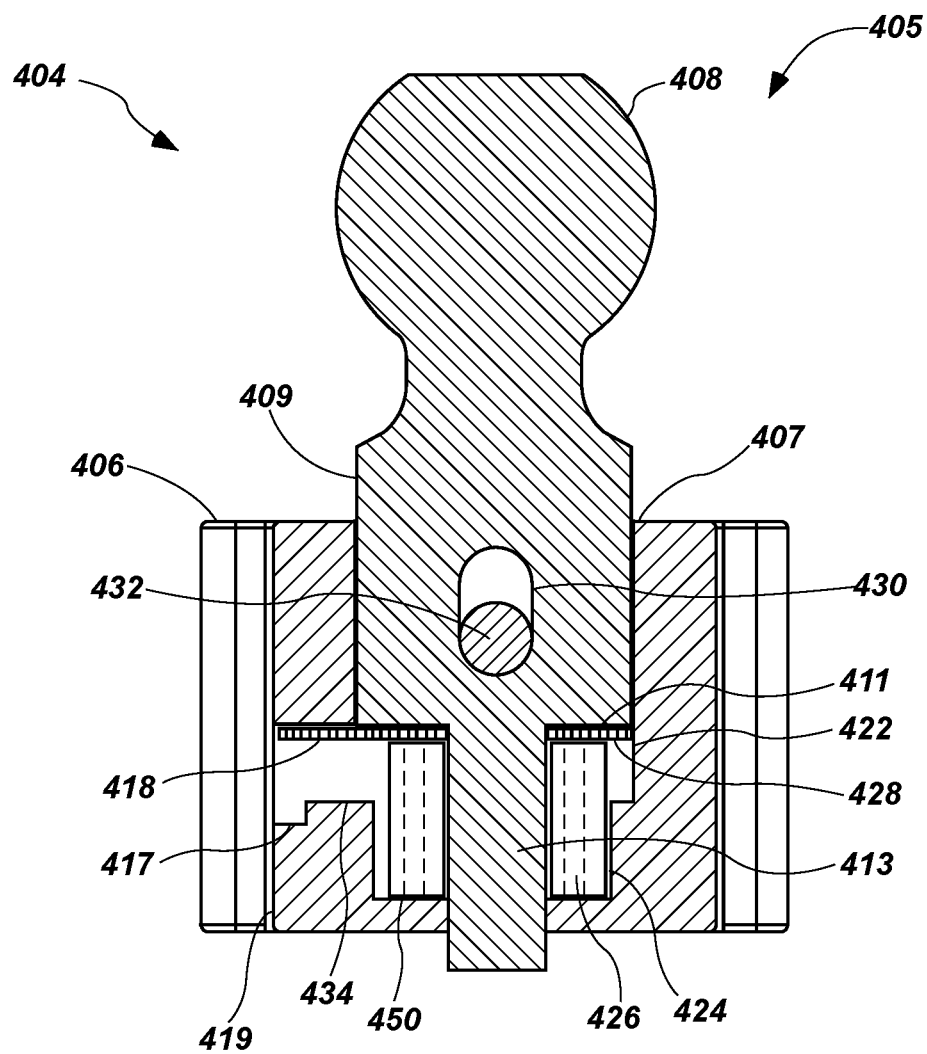
FIG. 18 is a cross-sectional view of the scale ball mount of FIG. 17 taken along line E-E.
Figure 19:
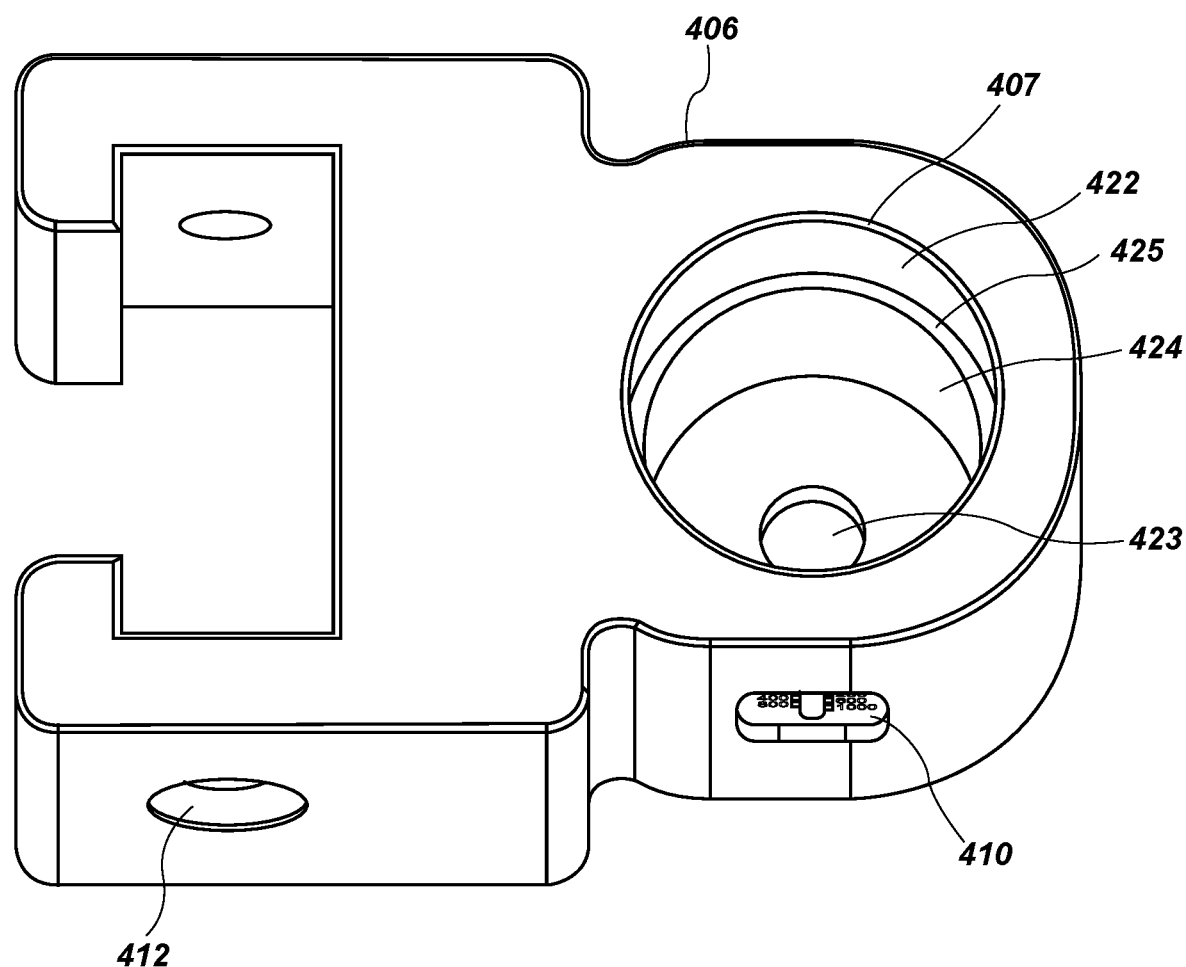
FIG. 19 is a top perspective view of the ball holder of the scale ball mount of FIG. 15.

FIGS. 13-14 show another embodiment of a trailer hitch system according to the present disclosure with ball mount 304, where like reference numerals refer to like features of the above embodiments. Ball mount 304 may include a hitch ball 308 having a first hitch ball 308a and a second hitch ball 308b installed in aperture 307. Hitch ball 308 may include a first transverse bore 330a and a second transverse bore 330b, which may be formed in body member 306. Body member 306 may include an upper surface 380 and a lower surface 382 of body member 306 through which aperture 307 is formed.

Further to the discussion of spacer 128 above with reference to FIGS. 1-6, spacer 128 may have a size, such as a diameter in the case that spacer 128 has a circular cross-section. The size of spacer 128 may be smaller relative to the size of the hitch ball support member 109. For example, the spacer 128 may be half the size of the hitch ball support member 109. In an embodiment, a diameter of spacer 128 may be one half the diameter of the hitch ball support member 109. In yet another embodiment, the diameter of spacer 128 may be anywhere between one-eighth and seven-eighths the diameter of hitch ball support member 109. Said another way, hitch ball support member 109 may have a diameter that is two times the diameter of the spacer, or that is anywhere between 1.2 and 6 times the diameter of the spacer. The sizing of the spacer may be selected based on the biasing requirements of the biasing component 126, as discussed in more detail herein.

Applicant has further invented methods of measuring the tongue weight of a trailer. In an embodiment, a method for measuring the tongue weight of a trailer may include providing a ball holder comprising a hitch ball disposed in the ball holder and a biasing component disposed below the hitch ball within the ball holder. The method may further include providing a hitch ball displacement gauge configured to measure the downward displacement of the hitch ball and placing a trailer hitch coupler of a trailer on the hitch ball, which method will ultimately lead to displaying the tongue weight of the trailer based on the downward displacement of the hitch ball.

The step of providing a ball holder of the above method may further include identifying the size of the hitch ball and providing a biasing component comprising a biasing tendency suitable for producing measurable downward displacement when the ball is loaded. Biasing tendency may include spring characteristics and spring property requirements for supporting the ball and the significant force placed on the ball in such a way that measurable displacement will result from the force. If the biasing tendency of the spring is too great, no measurable deflection will occur. If the biasing tendency is too small, all displacement will occur rapidly, with little force required to "bottom out" the biasing component such that the displacement will not be measurable. The method may also include sizing a first vertical bore to receive the ball mount and a second vertical bore to receive the biasing component, which sizing may take place based on the required biasing tendency of the biasing component, among other important determinations such as ball size and spacer size, as described further herein.

In the above referenced method, the displacement gauge may include a spacer disposed between the hitch ball and the ball holder, the spacer having a projection, and the projection may be an indicator pin that displays, within the displacement gauge, the downward displacement of the hitch ball. Such method may further include placing a load on the trailer, adjusting the balance of the load on the trailer to change the tongue weight displayed on the hitch ball displacement gauge, and/or adjusting the balance of a load on the trailer until the tongue weight displayed on the hitch ball displacement gauge is within an acceptable range.

In yet another method of the present invention, a method of measuring the tongue weight of a trailer may include providing a trailer hitch ball mount assembly having a shank configured and adapted to be installed into a hitch receiver, a drop bar extending downwardly from the shank, a ball support member engaged with and configured to pivot about the drop bar, the ball support member having a body member comprising a hitch ball aperture and plunger in fluid communication with a dial, and a hitch ball disposed in the hitch ball receiver of the ball support member. The method may include placing a trailer hitch coupler of a trailer on the hitch ball and displaying the tongue weight of the trailer based on a force applied at the plunger. In such a method, the plunger of the trailer hitch ball mount assembly may be positioned to contact the drop bar. In another embodiment of the method, the body member of the ball support member of the trailer hitch ball mount assembly may further include a pair of support arms extending from the body member, the pair of support arms defining a slot, and the plunger may be disposed in the slot.

Such a method according to this invention may further include placing a load on the trailer, adjusting the balance of the load on the trailer to change the tongue weight displayed on the hitch ball displacement gauge, and/or adjusting the balance of a load on the trailer until the tongue weight displayed on the hitch ball displacement gauge is within an acceptable range.

FIGS. 15-19 depict yet another embodiment of the present disclosure, where like reference numerals may correspond to like features of previously disclosed embodiments. There is shown a ball mount 404, which may be used in or part of a trailer hitch system as described in the present disclosure. The ball mount 404 may be a ball support member and may include a body or body member 406. The body 406 may comprise a hitch ball aperture 407 for receiving a trailer hitch ball component 405. The ball mount 404 may also comprise a hitch ball displacement gauge 410, or readout, configured and dimensioned to measure and display the force applied at the hitch ball component 405, which may include measuring and displaying the downward displacement of the hitch ball component 405. The hitch ball component 405 may comprise a hitch ball 408 and a hitch ball support member 409. The hitch ball support member 409 may have an undersurface 411 and may be either fixedly attached to the hitch ball 408 or may be unattached to and separate from the hitch ball 408 and disposed in alignment with hitch ball 408 such that the hitch ball support member 409 will be forced downwardly in response to downward displacement of hitch ball 408.

Hitch ball component 405 may also include a reduced shank portion 413 extending from undersurface 411 of the hitch ball support member 409. As described below in more detail, reduced shank portion 413 may cooperate with a biasing component 426, an indicator 428, a through-hole 423 and/or a pocket (not shown) to provide a number of benefits, as will be clear to those of ordinary skill in the art based on the present disclosure.

The hitch ball displacement gauge 410 may comprise a graded scale or gradation 416 on a display portion 417 and an indicator pin 418 extending from an indicator 428, which may be an indicator disk or indicator component. Indicator pin 418 may be disposed within an indicator channel 420. The gradation 416 may be a series of lines corresponding to numbers or values, whether stated or unstated, for translating the displacement of the indicator pin 418 as shown in the indicator channel 420 into a tongue weight of a trailer. The gradation 416 is just one method of displaying the trailer tongue weight on the displacement gauge. Any other indicator means, including digital rendering of the tongue weight based on the displacement of the hitch ball 405, may be employed to display the trailer tongue weight in response to a displacement of the trailer hitch ball 405. The indicator pin 418 may function in cooperation with other components of the ball mount 404 to display the downward displacement of the hitch ball 405 as discussed in greater detail below.

The ball mount 404 may, including aperture 407, comprise a first vertical bore 422, or upper vertical bore, which may be disposed in the body 406 of the ball mount 404. First vertical bore 422 may be dimensioned and configured as the hitch ball aperture 407 for receiving the trailer hitch ball 405. Hitch ball aperture 407 may be a hole of any shape, including round, square, rectangular or any other shape, whether polygonal, circular, or otherwise. Accordingly, hitch ball aperture 407 may comprise one or more bores, such as first vertical bore 422, which may comprise any shape, whether circular or otherwise, such as square, rectangular, polygonal, or any other geometric configuration suitable for receiving a trailer hitch ball component 405.

A second vertical bore 424, or lower vertical bore, may also be disposed in the body 406 of the ball mount 404. Second vertical bore 424 may be configured and dimensioned to receive a biasing component 426. Like first vertical bore 422, second vertical bore may comprise any shape, whether circular or otherwise, such as square, rectangular, polygonal, or any other geometric configuration suitable for receiving a biasing component 126.

First vertical bore 422 may be disposed above second vertical bore 424. Said another way, second vertical bore 424 may disposed below first vertical bore 422. First and second vertical bores 422 and 424 have diameters corresponding with each individual vertical bore, and the diameters of first and second vertical bores 422 and 424 may be different. First vertical bore 422 may be larger, or have a larger diameter, than second vertical bore 424. A lip 425 may be formed by the decrease in diameter of lower vertical bore 424 as compared to upper vertical bore 422. In other words, the difference in the diameters of upper vertical bore 422 and the lower vertical bore 424 may form lip 425. In an embodiment, lip 425 may be configured and dimensioned to contact undersurface 411 of the hitch ball 405 to prevent further downward displacement of the hitch ball 405.

Biasing component 426 may be disposed within second vertical bore 424, and may extend into first or upper vertical bore 422 when hitch ball 405 is at rest or without a load.

Biasing component 426 may be a spring, including a coil spring or a urethane spring, or may be one or more bellview washers, or may be any other component configured to provide a bias or to provide a compressible force against another body. In an embodiment, a biasing component 426 may be configured and dimensioned to be disposed below the hitch ball 405. Biasing component 426 may contact the hitch ball and oppose a downward displacement of the hitch ball. In an embodiment, the biasing component 426 may be disposed in contact with the undersurface 111 of the hitch ball support member 409, such that downward displacement of the hitch ball component 405 compresses the biasing component 426.

Biasing component 426 may include a center cavity 427, which may be configured and dimensioned to allow reduced shank portion 413 of hitch ball 405 to extend at least partially into center cavity 427. Center cavity 427 and reduced shank portion 413 may cooperate to center or align biasing component 426 in aperture 407. For example, if biasing component 426 is a urethane spring, compression of urethane spring 426 will cause the spring to expand radially as it is laterally compressed. If urethane spring 426 is not aligned or centered in lower vertical bore 424 of aperture 407, urethane spring 426 may prematurely contact a sidewall of lower vertical bore 424, which may lead to a misreading of the downward displacement of hitch ball 405 and thus tongue weight of the trailer. Reduced shank portion 413 accordingly may control the alignment of biasing component, spring, or urethane spring 426 by extending at least partially into the center cavity 427 of the biasing component 426.

In an embodiment, reduced shank portion 413 may extend completely through center cavity 427 of biasing component 426. In such an embodiment, ball holder 406 may comprise a through-hole 423 disposed at the bottom of aperture 407 or at the bottom of lower vertical bore 424. In an embodiment, reduced shank portion 413 may extend into or through through-hole 423. In yet another embodiment, ball holder 406 may instead comprise a pocket, or a hollowed out portion or cavity (not shown), into which reduced shank portion 413 may extend and travel with the downward displacement of hitch ball 405. It will be understood to those of ordinary skill in the art that through-hole 423 or an alternative pocket or cavity without a through-hole, may provide added benefits of stabilizing and providing rigidity to hitch ball 405.

Ball mount 404 may further comprise an indicator 428 disposed between the biasing component 424 and the hitch ball 405. Indicator 428 may be an indicator disk, or may be an indicator washer, or indicator component, and may be any structure suitable for residing between the biasing component 424 and the hitch ball 405 with a projection 418 or indicator pin 418 extending from away from the indicator 428. Indicator pin 418 may be a member extending radially from the indicator 428 outward. The projection or indicator pin 418 may be disposed in an indicator bore 434. Indicator bore 434 may be disposed between lower bore 424 and displacement gauge 410, which may be disposed on an outside surface of the body 406. In other words, indicator bore 434 may be transverse to lower bore 124 and may run from lower bore 424 to an outside surface of the body 106 where displacement gauge 410 may be located.

As explained above, indicator pin 418 may cooperate with hitch ball displacement gauge 410 to display the downward displacement of the hitch ball. As the hitch ball 405 receives a load and pushes against the biasing component 426, indicator 428 and projection or indicator pin 418 will move downward as the hitch ball 405 moves downward. The displacement of the hitch ball 405, and the corresponding displacement of the indicator 428 and indicator pin 418, will be displayed through the indicator channel 420 on the display portion 417 of the displacement gauge 410. In other words, gauge 410 may include an opening, which may be the opening to indicator channel 420, through which the indicator 428, or more specifically the indicator pin 418, is viewable to a user.

It will be appreciated that displacement gauge 410 may be calibrated based on the resistance of biasing component 426 such that the displacement of the ball hitch 405, and subsequent displacement of the indicator 128 as revealed by indicator pin 418 through the indicator channel 420 of the displacement gauge 410, may represent the static force applied to the hitch ball 405. The static force applied to the hitch ball may also be referred to as the tongue weight of the trailer coupled to the hitch ball. With the displacement gauge 410 calibrated, the display portion 417 of the displacement gauge 410 may include a scale or other means for translating the degree of displacement of the indicator pin to the amount of the trailer tongue weight.

Scale Ball Mount 404 may further comprise a shim 450 disposed below the biasing component 426. One or more shims, or at least one shim, may be used to calibrate the readout on gauge 410, similar to as described above. Multiple shims 426 may be used to adjust the placement of biasing component 426 and indicator 428. Shim 450 may include a center opening 452, and indicator pin 418 may include a center opening 429. Center openings 452 and 429, of shim 450 and indicator 428 respectively, allow reduced shank portion 413 to pass through shim 450 and indicator 428. In an embodiment, center openings 452 and 429 are of sufficient size to not interfere or contact reduced shank portion 413. In another embodiment, a tight fit or a loose contact fit may be desired between reduced shank portion 413 and center openings 452 and 429.

Hitch ball 405 may comprise a transverse ball bore 430 for receiving a hitch ball pin 432. Transverse ball bore 430 may be disposed on a base portion or ball support member 409 of hitch ball 405, or any portion of hitch ball 405 that may be contained within ball mount 404. Ball mount 404 may comprise a transverse ball pin bore 433 corresponding to transverse ball bore 430. Transverse ball pin bore 433 may be disposed transverse of upper bore 422, and may be disposed between upper bore 422 and a front face 431 of body member 106. Transverse ball pin bore 433 may be configured and dimensioned to receive the ball pin 432. Said another way, ball pin 432 may be disposed within the ball holder and within the transverse bore in the hitch ball. Transverse ball bore 430 may be obround in order to allow hitch ball 405 to be displaced vertically. The obround or oval-shaped nature of transverse ball bore 430 functions to allow the hitch ball 405 to move freely against the biasing component 426 while securely and removably holding the hitch ball 105 in place within the ball mount 404.

Figure 20:
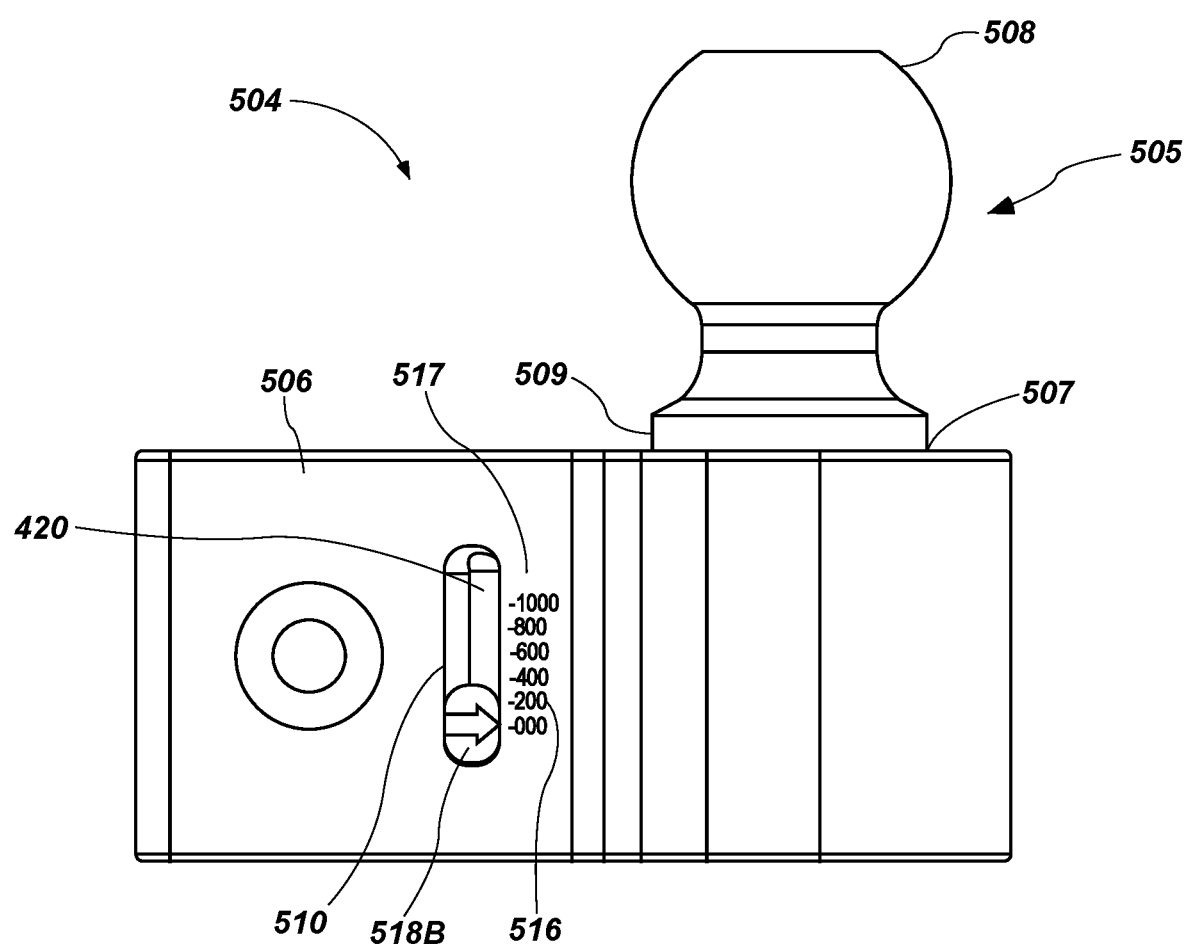
FIG. 20 is a side view of another example of a scale ball mount according to an embodiment of the present disclosure.
Figure 21:
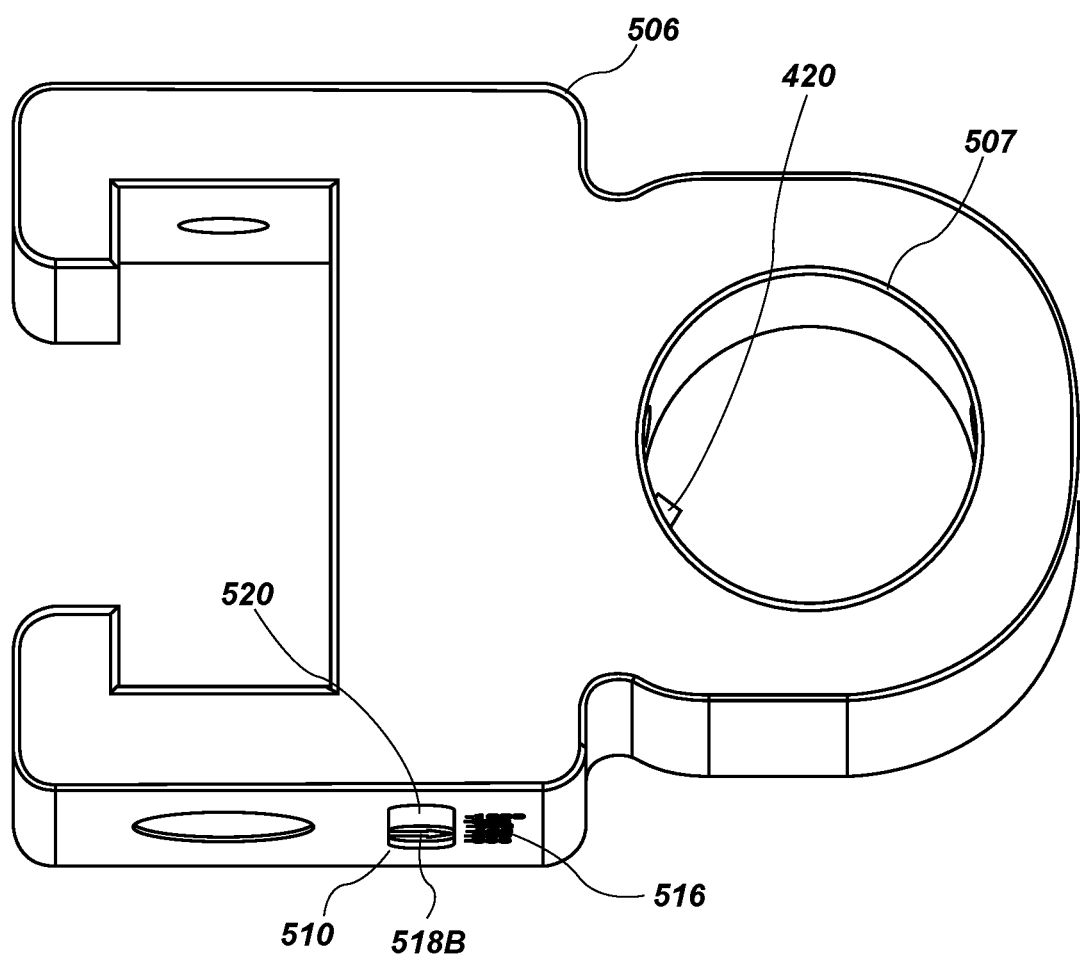
FIG. 21 is a top perspective view of the ball holder of the scale ball mount of FIG. 20.
Figure 22:
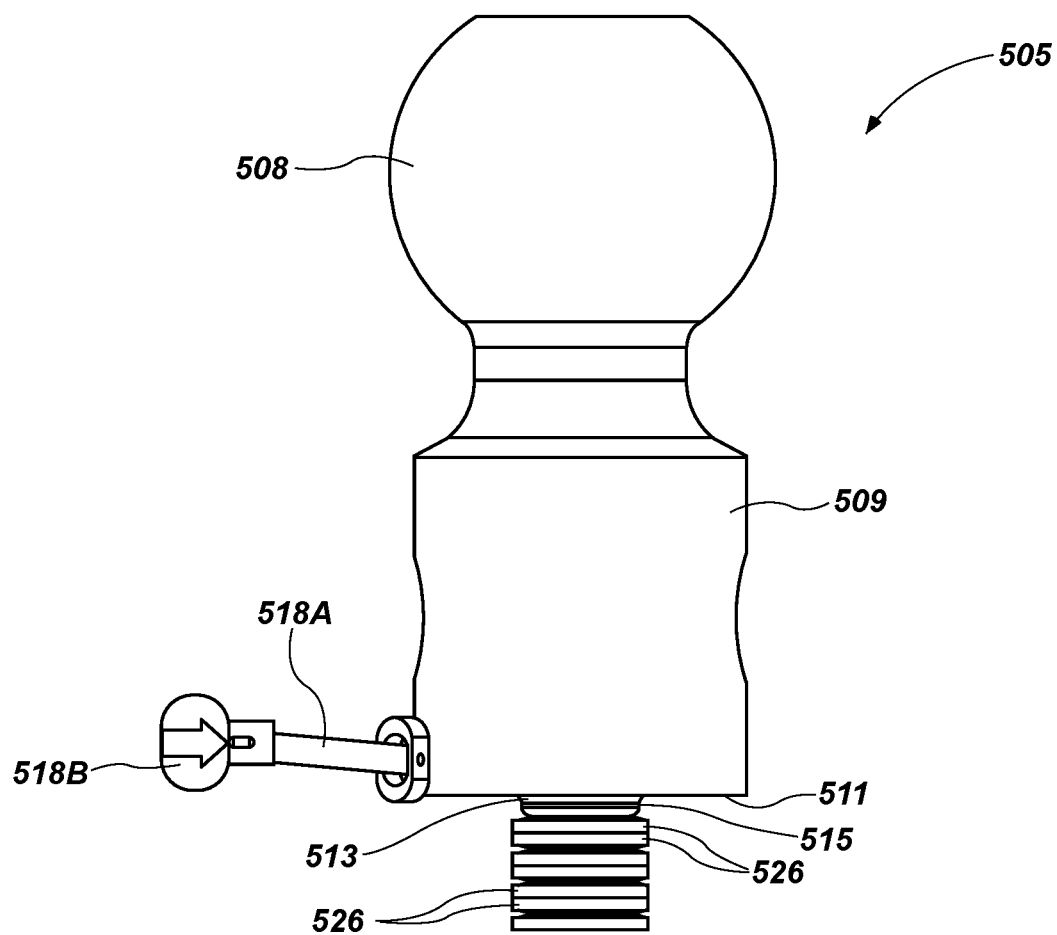
FIG. 22 is a side view of an internal portion of the scale ball mount of FIG. 20.

FIGS. 20-22 depict another scale ball mount 504 according to an embodiment of the present disclosure. Scale ball mount 504 may be considered an angled indicator concept, as will be apparent from the below description. Ball mount 504 may comprise body 506 having an aperture 507. A hitch ball component 503, which may comprise a hitch ball 508, a ball support member 509 and undersurface 511 and a reduced shank portion 513, may be disposed in aperture 507.

Ball mount 504 may further include a gauge 510 having a comprise a graded scale or gradation 516 on a display portion 517, all as described herein. Gauge 510 may also include an indicator pin tip 518B extending from an angled indicator 518A. Angled indicator 518A may be disposed within an angled indicator channel 520, and may connect to hitch ball portion 503 near the bottom of hitch ball support member 509 above undersurface 511. Angled indicator 518A and angled indicator channel 520 may be configured and dimensioned to allow gauge 510 to be placed at a location that is offset from the location of hitch ball 505. For example, as depicted, angled indicator 518A and angled indicator channel 520 may place gauge further away from a trailer and closer to a tow vehicle, which may provide for easier access and reading by a user.

Ball mount 504 may include a biasing component that is one or more, or a plurality of, bellview washers 526. Bellview washers 526 may provide the required biasing and adjustability by being selected in appropriate sizes and stacked in desired numbers. As described above with reference to biasing components, bellview washers may also include a center opening for a reduced shank portion 513 of hitch ball 505 to pass. In an embodiment, reduced shank portion 513 may be a short protrusion from undersurface 511, which is configured and dimensioned to interact or mate with the biasing component, in this case bellview washers 526. For example, reduced shank portion 513 may include a channel 515, which may be configured for seating with a portion of the biasing component to provide the alignment discussed herein.

Figure 23:
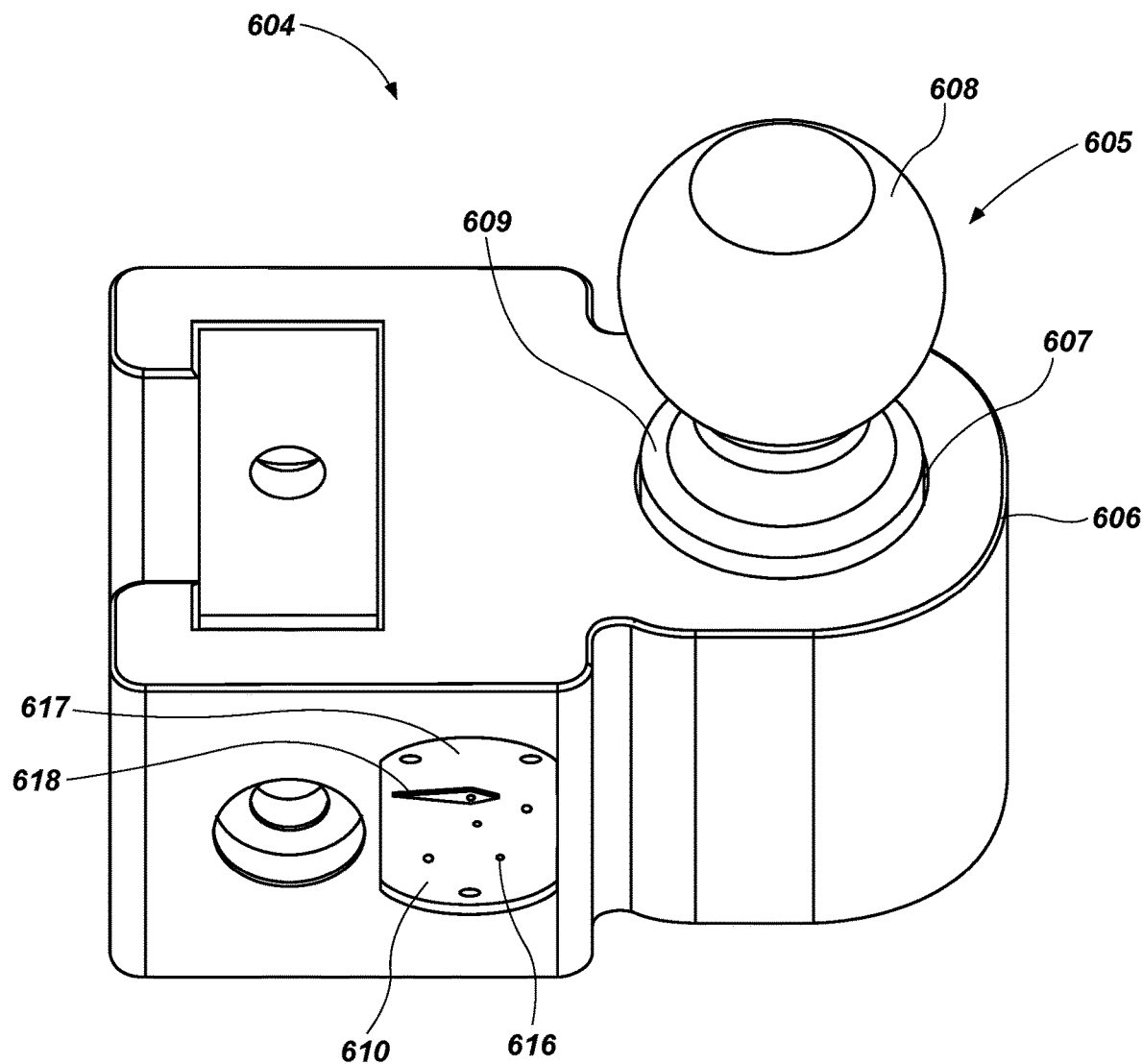
FIG. 23 is a perspective view of yet another embodiment of a scale ball mount according to the present disclosure.
Figure 24:
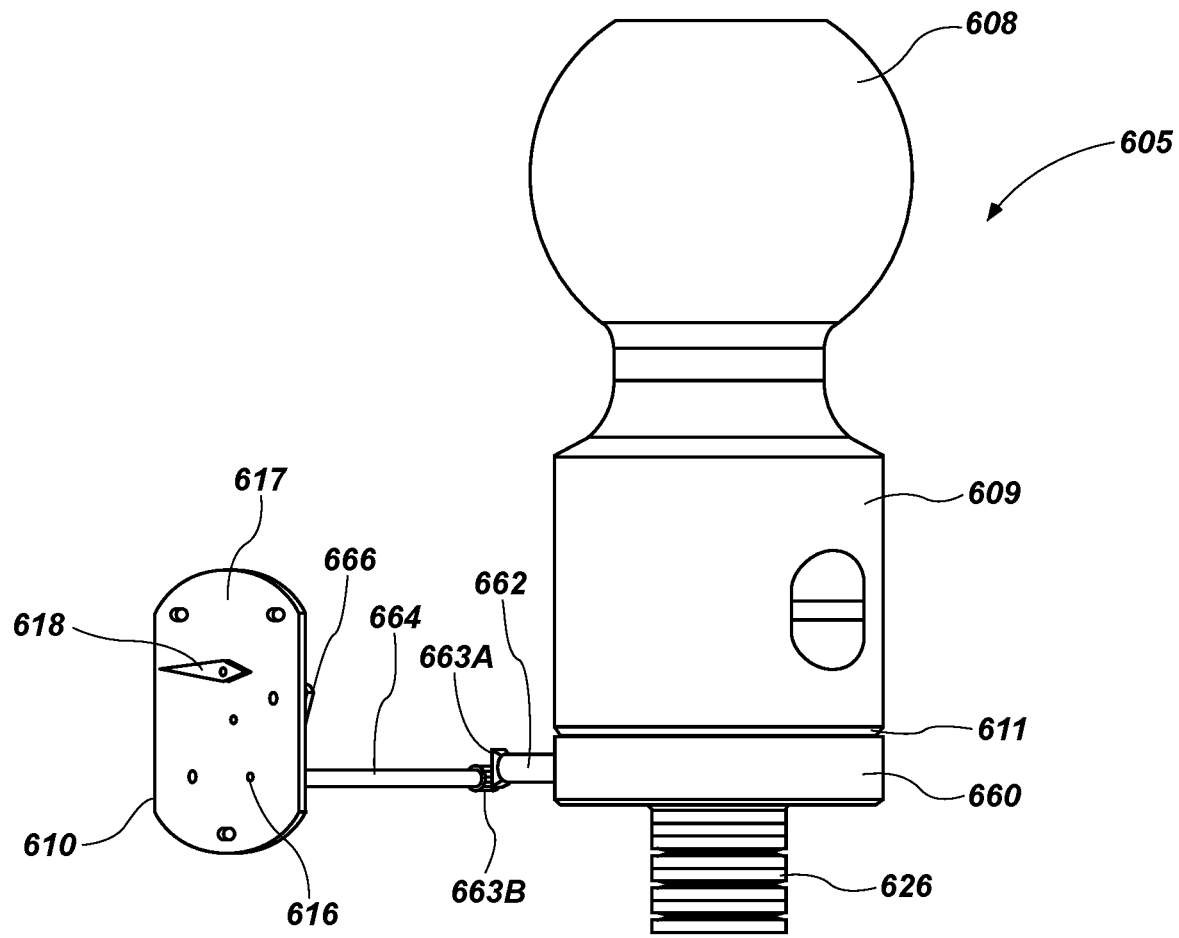
FIG. 24 is a side view of the internal components of the scale ball mount of FIG. 23.

As shown in FIGS. 23-24, yet another embodiment of a scale ball mount 604 according to the present disclosure may comprise a gauge 610 that is a dial. Scale ball mount 604 may include aperture 607 in which scale ball component 605 is disposed. Scale ball component 605 may include scale ball 608, ball support member 609, and undersurface 611. Disposed below scale ball component 605, in contact with undersurface 611, may be a indicator disk 660. Similar to indicators and indicator pins described above, displacement disk 660 may be configured to convey the downward displacement of the hitch ball 605. The linear travel of the hitch ball 605, and the corresponding travel of the indicator disk 660, is converted to a rotational read out of the dial.

Indicator disk 660 may comprise indicator projection 662. Indicator projection 662 may communicate with a dial shaft 664, which in turn moves a dial mechanism 666 to cause an indicator 618 to spin on dial gauge 610. Between indicator projection 662 and dial shaft 664 may be an actuator 663, which may be a linear actuator for converting linear motion to rotational motion. For example, actuator 663 may comprise rack 663B and pinion 663A for converting the linear displacement of indicator projection 662 to rotational motion of dial shaft 664.

Dial gauge 610 may have a display portion 617 having a graded scale or gradation 616. As dial shaft 664 rotates based on the linear displacement of indicator disk 660 caused by downward displacement of hitch ball 605, indicator 618 will advance to display the tongue weight of the trailer. Other details and alternatives related to actuator 663 and dial mechanism 666 will be understood by those of ordinary skill in the art to apply to the present disclosure.

Figure 25:
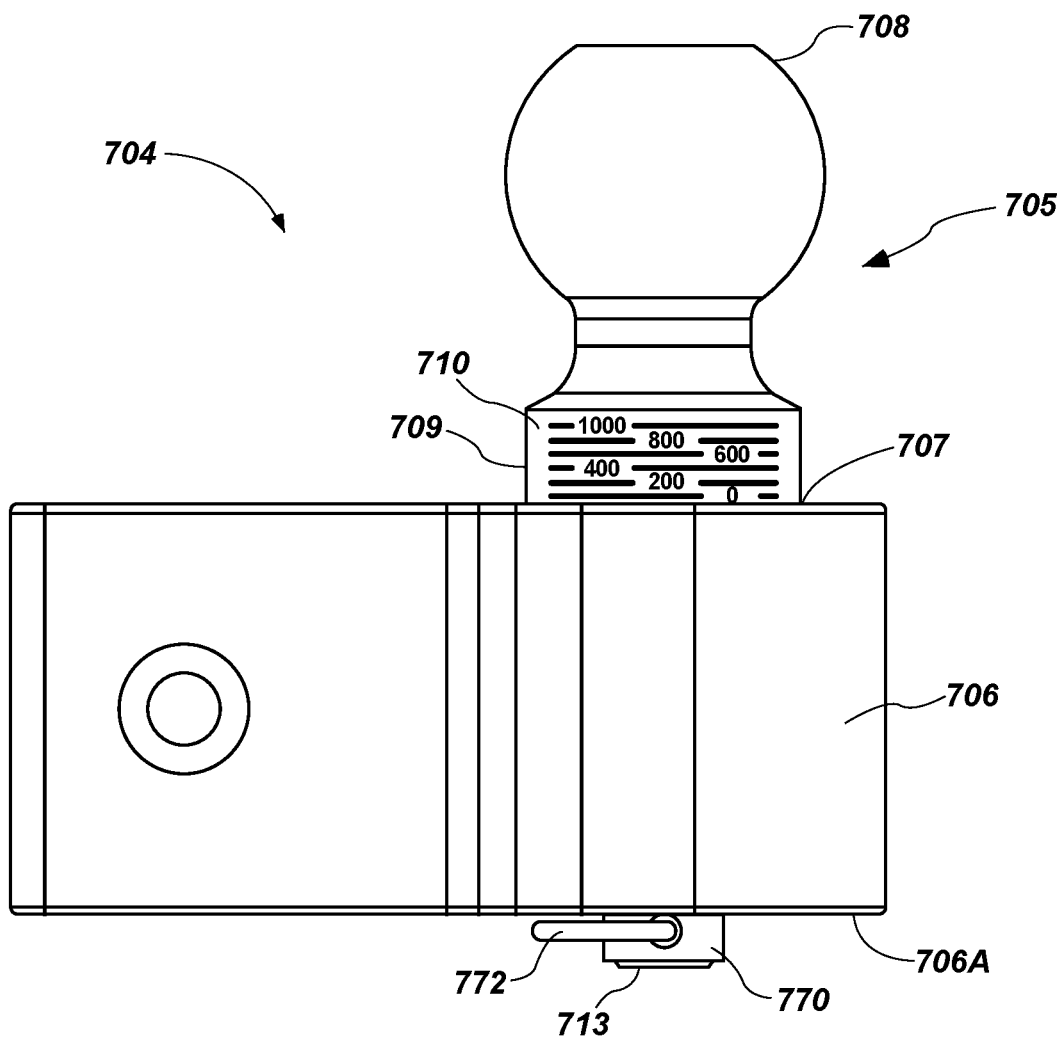
FIG. 25 is a side view of another example of a scale ball mount according to an embodiment of the present disclosure.

FIG. 25 shows another embodiment of a scale ball mount 704 according to the present invention. Scale ball mount 704 may include a gauge 710 that is a plurality of marks 716 disposed on the hitch ball 705, or more specifically, the hitch ball support member 709 of the hitch ball component 705. Gauge 710 and marks 716 display the tongue weight of a trailer based on the marks visible outside of the ball holder or scale ball mount 704, or in other words above the top edge of the body 706.

Scale ball mount 704 has internal components as described herein, which may include a biasing component (not shown). As the weight of a trailer tongue displaces hitch ball 705 downward, the scale of indicator marks 716 displays the weight of the trailer tongue based on the calibration of the biasing component, as described herein. In an embodiment, scale ball mount 704 may include only a biasing component disposed in aperture 707 below scale ball 705. In an embodiment, shims may be included. It will be understood that the various features of scale ball mounts disclosed herein may be incorporated, included a lip for preventing over-displacement of the scale ball mount, which can lead to over-compression of biasing components, in particular urethane springs, leading to failure of the calibration.

Scale ball mount 704 may include a reduced shank portion 713 extending into and past a through-hole in the bottom of the ball holder, or the body 706 of the scale ball mount 704. In an embodiment, stop 770 may be disposed on the reduced shank portion 713 that is extending out of the through-hole. The stop may include a pin 772, and the stop and pin may be configured to cooperate with the reduced shank portion 713 to be adjustably placed on the reduced shank portion 713 to prevent the biasing component from over-biasing the hitch ball when no load is applied, in a manner that would provide an incongruent readout on gauge 710. For example, stop 770 may be placed such that when it contacts a bottom surface 706A of the ball holder or body 706 of ball mount 704, gauge 710 shows a reading of zero for tongue weight when no load is applied to hitch ball 705.

Those of ordinary skill in the art will appreciate that ball mount 704 with its gauge 710 having indicator marks 716 disposed on the hitch ball, may provide a durable and straightforward solution for measuring the tongue weight of the trailer, and will further understand that the various components described herein may be used in combination with ball mount 704.

Figure 26:
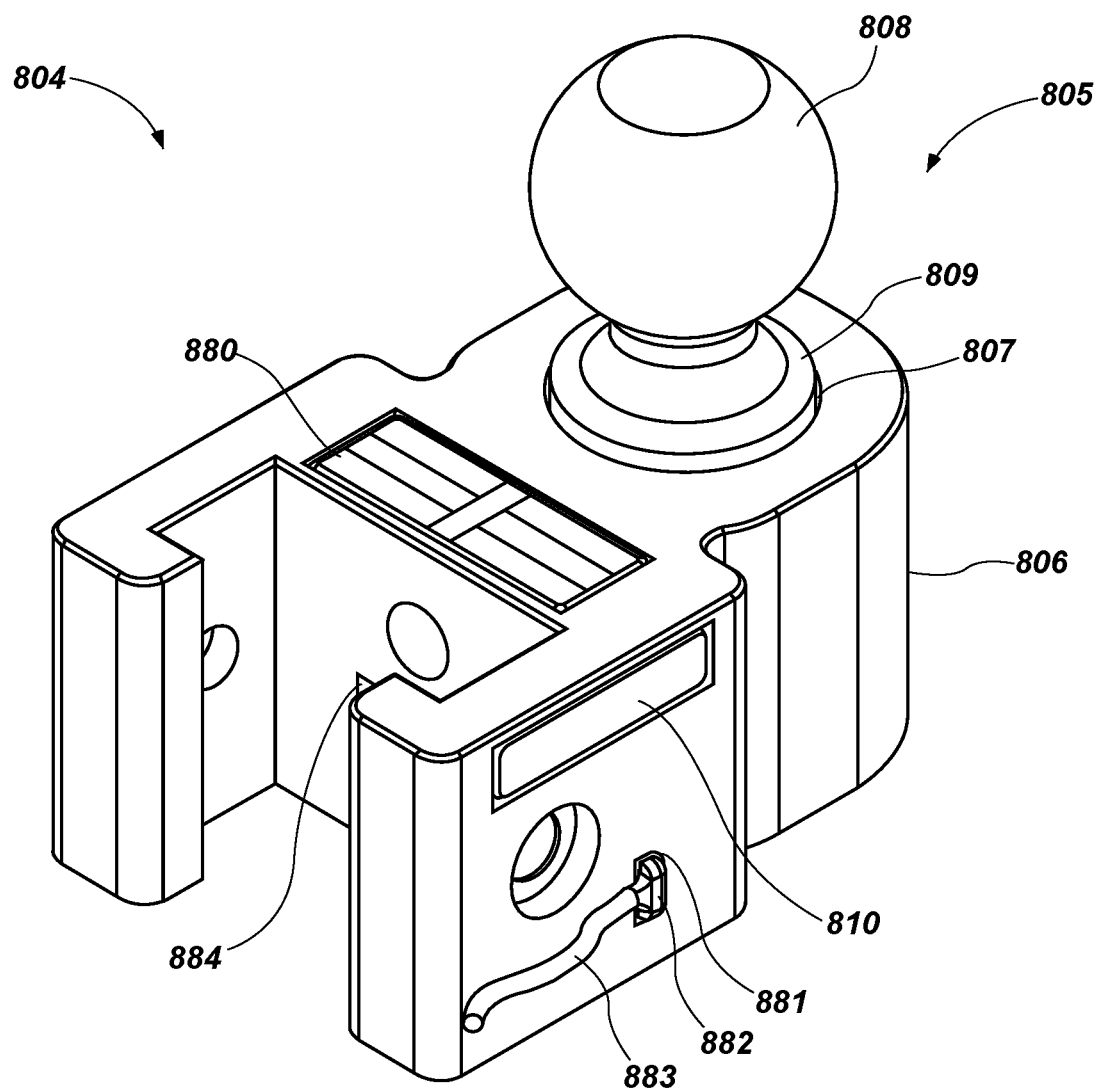
FIG. 26 is a perspective view of a scale ball mount according to another embodiment of the present disclosure.
Figure 27:
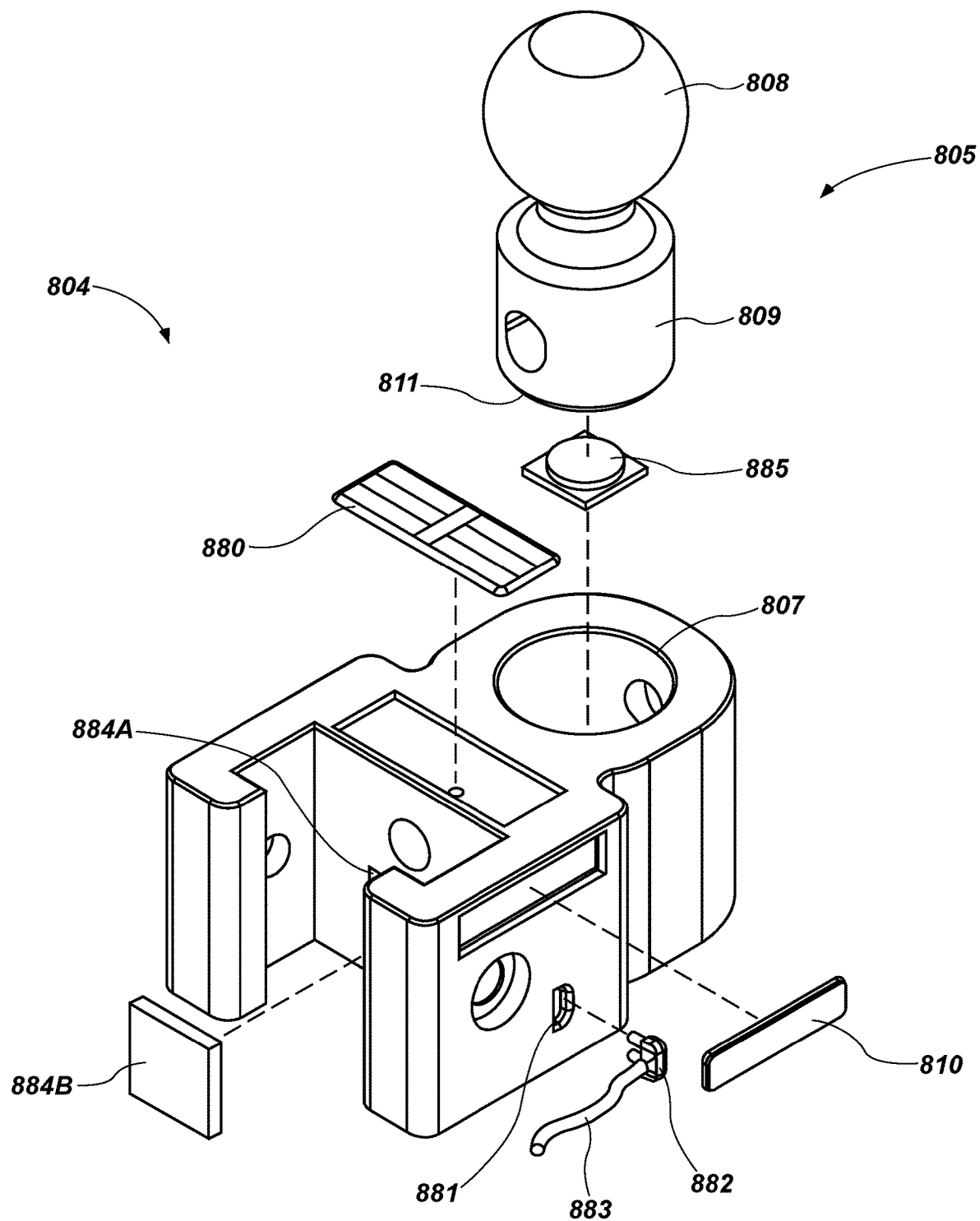
FIG. 27 is an exploded perspective view of the scale ball mount of FIG. 26.

FIGS. 26 and 27 depict yet another example of a scale ball mount 804 according to an embodiment of the present disclosure. Scale ball mount 804 may include ball holder or body 806 having an aperture 807 in which is disposed a hitch ball component 805. Hitch ball component may comprise hitch ball 808, hitch ball support member 809 and undersurface 811.

A gauge 810 may be disposed on the ball support member, the gauge configured and dimensioned to display a tongue weight of a trailer based on the downward force applied at the hitch ball. For example gauge 810 may include a digital indicator, which may be an LCD screen or any other indicator for digitally displaying the tongue weight of the trailer. A load cell 885 may be disposed below hitch ball 805 in aperture 807, and may be operably connected to gauge 810 to display the tongue weight of a trailer. Other known components, including a processor and other components, all of which may be housed on a printed circuit board, may reside within a cavity 884 in ball holder 806, which cavity 884 may have an opening 884A and a cap or lid 884B.

Ball mount 804 may receive power either by a power cord 883 having a male connector 882 to be received by a female connector 881 disposed in ball holder 806. In another embodiment, ball mount 804 may receive power through a solar panel 880. One of ordinary skill in the art will understand that ball mount 804 may provide the digital readout of the tongue weight of the trailer based on the features disclosed herein.

Figure 28:
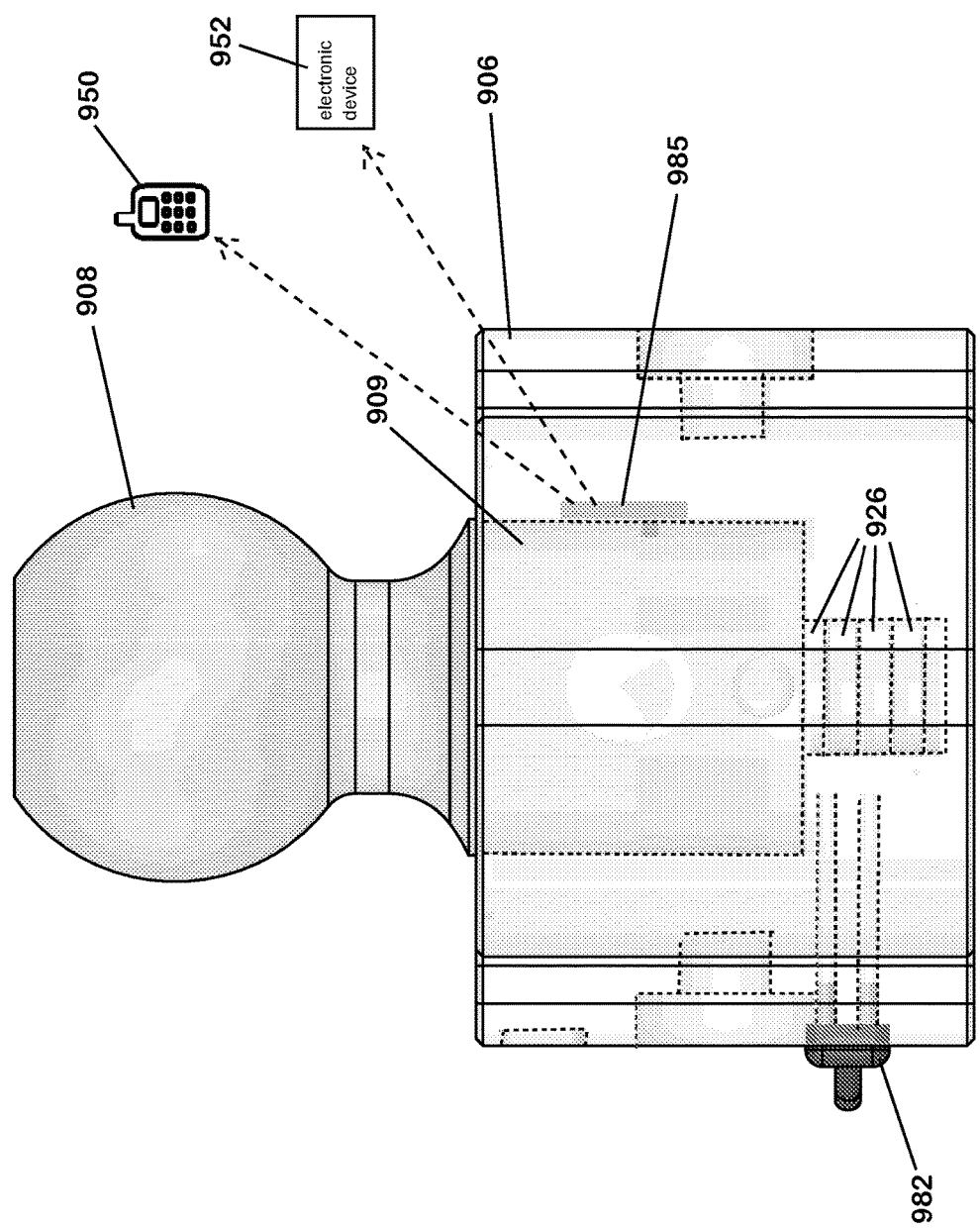
FIG. 28 is a side view of a scale ball mount according to another embodiment of the present disclosure.
Figure 29:
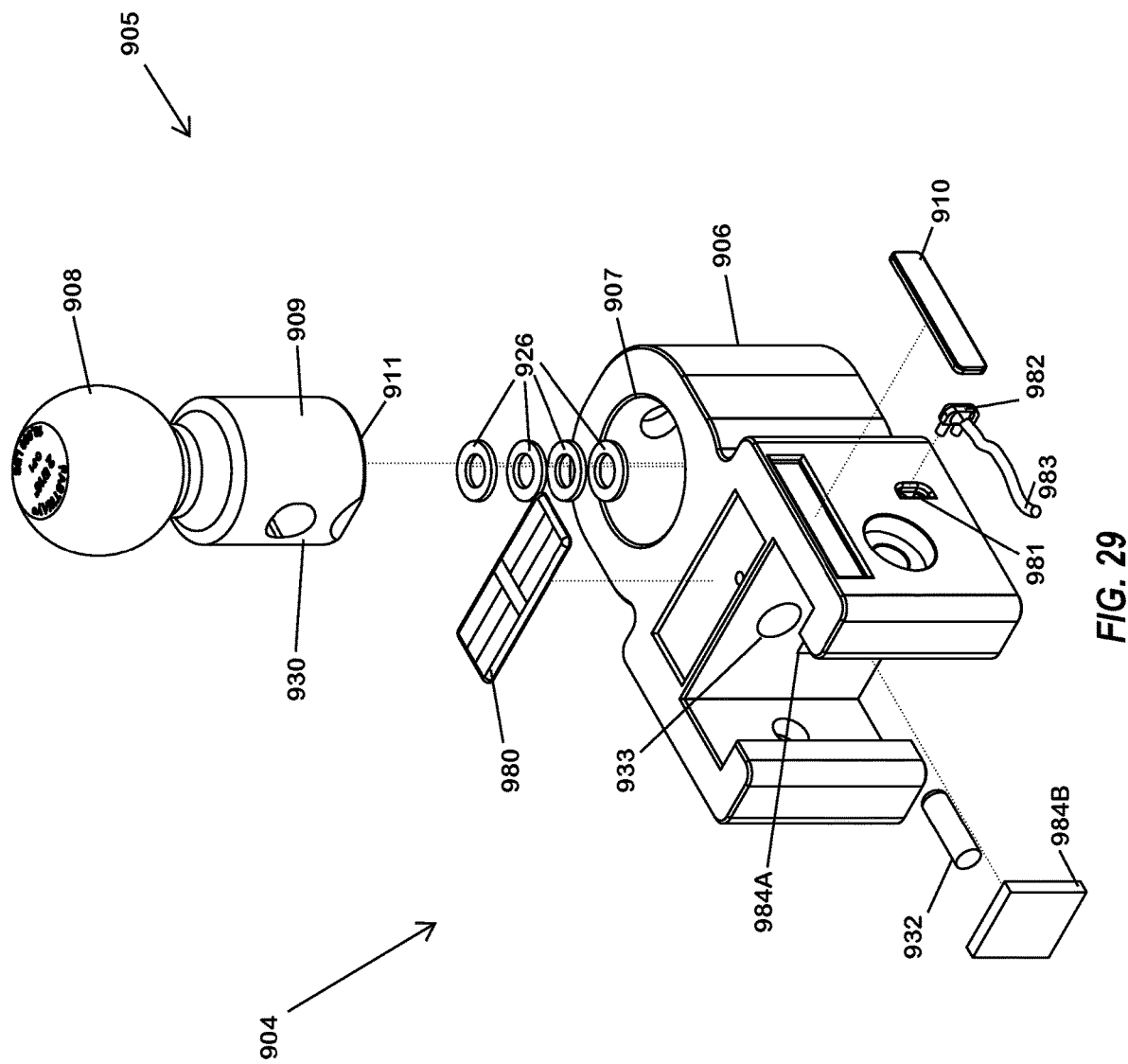
FIG. 29 is an exploded perspective view of the scale ball mount of FIG. 28.

FIGS. 28 and 29 depict yet another example of a scale ball mount 904 according to an embodiment of the present disclosure. Scale ball mount 904 may include ball holder or body 906 having an aperture 907 in which is disposed a hitch ball component 905. Hitch ball component 905 may comprise hitch ball 908, hitch ball support member 909 and undersurface 911. Hitch ball 905 may comprise a transverse bore 930 for receiving a hitch ball pin 932. Transverse bore 930 may be disposed on a base portion of hitch ball component 905, or any portion of hitch ball component 905 that may be contained within ball mount 904. Ball mount 904 may comprise a transverse pin bore 933 corresponding to transverse bore 930, which also receives the hitch ball pin 932, thereby securing the hitch ball component 905 to the ball mount 904.

Ball mount 904 may also include a biasing component 926 that is one or more, or a plurality of, bellview washers 926. Bellview washers 926 may provide the required biasing and adjustability by being selected in appropriate sizes and stacked in desired numbers. The bellview washers 926 may be of the same form as described above with reference to biasing components. Other biasing components known in the art and described herein may also be used in place of the bellview washers 926.

A gauge 910 may be disposed on the ball mount 904, the gauge 910 configured and dimensioned to display a tongue weight of a trailer based on the linear travel of the hitch ball component 905, against the biasing component 926. For example gauge 910 may include a digital indicator or readout 910a, which may be an LCD screen or any other indicator for digitally displaying the tongue weight of the trailer. A linear travel or proximity sensing device 985 may be disposed on, fixed to, or otherwise attached to hitch ball 905 within the aperture 907, and may be operably connected to gauge 910 to display the tongue weight of a trailer, based on the linear travel or displacement of the hitch ball 905. The linear travel or proximity sensing device 985 may also be configured to transmit information, which may include, but is not limited to: linear travel of the hitch ball 905 and/or the tongue weight of the trailer. This transmission of information can also be configured to be received by remote or independent electronic devices, for example, cell phones 950, or other electronic devices 952, such as, computers, tablets, vehicle onboard electronic interfaces or computers or any other device capable of receiving and/or processing information transmitted by the linear travel or proximity sensing device 985. Other known components, including a processor and other components, all of which may be housed on a printed circuit board, may reside within a cavity 984A in ball holder 906, which cavity 984A may have a cap or lid 884B.

Ball mount 904 may receive power either by a power cord 983 having a male connector 982 to be received by a female connector 981 disposed in ball holder 906. In another embodiment, ball mount 904 may receive power through a solar panel 980. One of ordinary skill in the art will understand that ball mount 904 may provide the digital readout of the tongue weight of the trailer based on the features disclosed herein.

Figure 30:
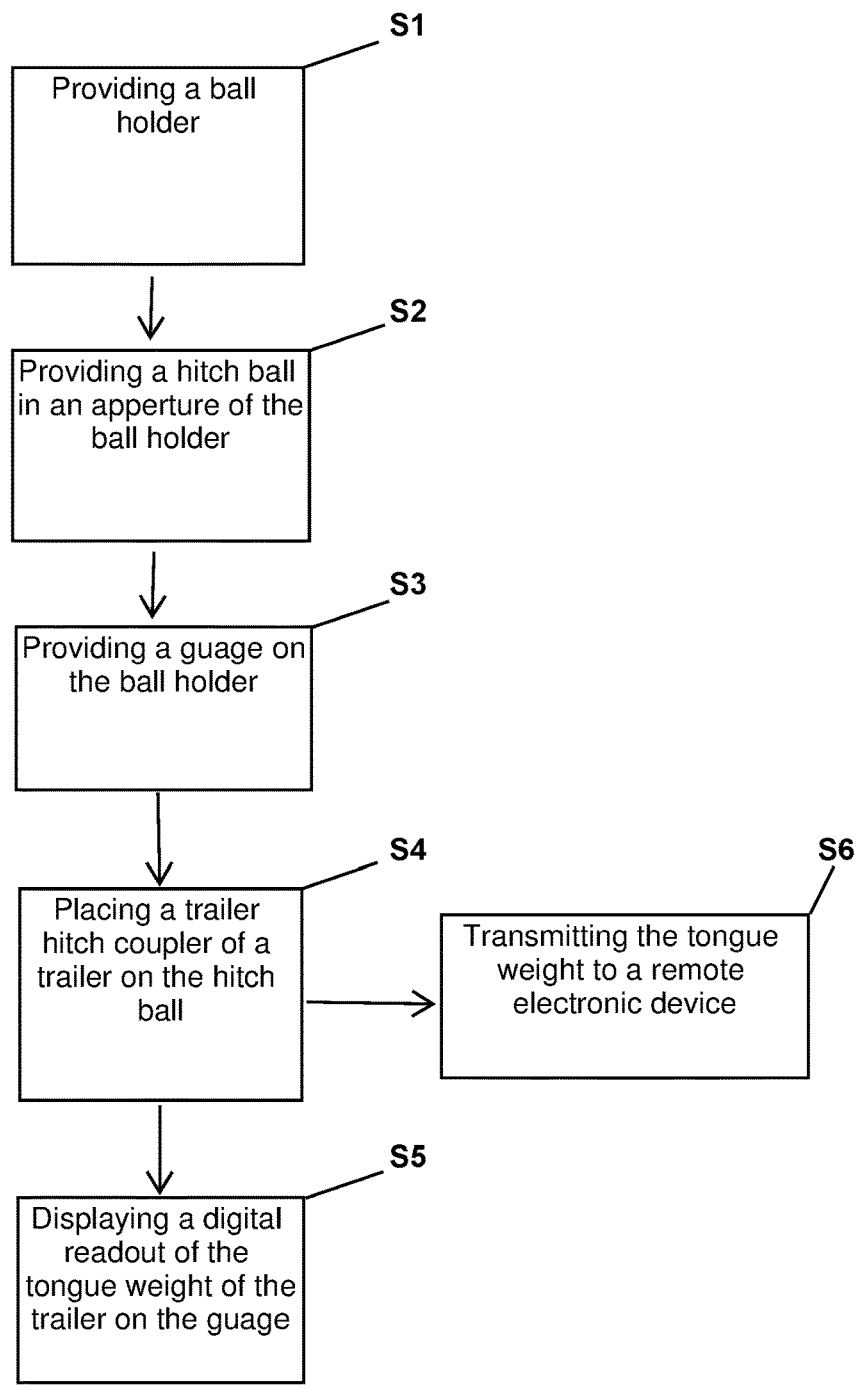
FIG. 30 is a flow chart illustrating a method according to an embodiment of the present disclosure.

FIG. 30 illustrates a flow diagram of another method of measuring the tongue weight of a trailer included in the present disclosure. The method may included the steps of: (S1) providing a ball holder comprising an aperture; (S2) providing a hitch ball disposed in the aperture of the ball holder; (S3) providing a gauge disposed on the ball holder; (S4) placing a trailer hitch coupler of a trailer on the hitch ball; (S5) displaying a digital readout of the tongue weight of the trailer on the gauge, based on the downward force applied at the hitch ball; and/or (S6) transmitting the tongue weight to a remote electronic device. In this exemplary embodiment of the disclosed method, the steps of, (S5) displaying a digital readout of the tongue weight of the trailer on the gauge, based on the downward force applied at the hitch ball, and (S6) transmitting the tongue weight to a remote electronic device, may be performed as alternatives, together, or in any desired order. The transmitting of the tongue weight to the remote electronic device may be facilitated by any known electronic transmission method. Additionally, each of mechanical or electrical elements and devices provided by the method steps disclosed above, may include the same or similar mechanical and electrical elements and devices as disclosed herein with respect to any the disclosed embodiments, or similar or equivalent elements or devices not specifically disclosed herein, but able to perform the same or similar functions.

Yet another method of measuring the tongue weight of a trailer is included in the present disclosure, the method including the steps of: (1) providing a ball holder comprising an aperture; (2) providing a hitch ball disposed in the aperture of the ball holder; (3) providing a gauge disposed on the ball holder; (4) placing a trailer hitch coupler of a trailer on the hitch ball; and (5) displaying the tongue weight of the trailer on the gauge based on the downward force applied at the hitch ball.

Such a method may further include the steps of providing a spring disposed below the hitch ball in the aperture of the ball holder and providing an indicator disposed between the spring and the hitch ball in the aperture of the ball holder.

In an embodiment, the method may include the additional steps of identifying the size of the hitch ball and providing a biasing component disposed in the aperture of the ball holder, the biasing component comprising a biasing tendency suitable for producing measurable downward displacement when the ball is loaded with the weight of a trailer.

In an embodiment, the method may further include the steps of providing at least one shim disposed below the biasing component in the aperture of the ball holder to calibrate the measurable downward displacement and corresponding trailer weight displayed on the gauge. The biasing component of the present method may be a urethane spring, or may be any other biasing component, as disclosed herein. Similarly, the hitch ball and ball holder may have any of the features disclosed herein, including reduced shank portion, though-hole and pocket.

Also, the present method may include the steps of placing a load on the trailer, adjusting the balance of the load on the trailer to change the tongue weight displayed on the hitch ball displacement gauge, and/or adjusting the balance of a load on the trailer until the tongue weight displayed on the hitch ball displacement gauge is within an acceptable range.

In an embodiment, the present disclosure may relate to an apparatus for measuring the tongue weight of a trailer. The apparatus may include a ball holder including an aperture and a through-hole at the bottom of the aperture. The apparatus may include a hitch ball disposed in the aperture of the ball holder, the hitch ball having a hitch ball support member and a reduced shank portion extending from an undersurface of the hitch ball support member. The apparatus may include a urethane spring disposed below the hitch ball in the aperture of the ball holder, an indicator disposed between the hitch ball and the spring in the aperture of the ball holder, and a shim disposed below the urethane spring in the aperture of the ball holder. The apparatus may include a gauge disposed on the ball holder, the gauge including an opening through which the indicator is viewable, the gauge configured and dimensioned to display the tongue weight of a trailer based on the downward displacement of the hitch ball. The spring of the apparatus may be disposed in contact with an undersurface of a hitch ball support member, such that downward displacement of the hitch ball compresses the spring. Further more, the reduced shank portion of the hitch ball may extend through a center cavity of the spring and into the through-hole of the ball holder. The aperture of the ball holder may further include an upper vertical bore and a lower vertical bore, wherein a diameter of the lower vertical bore is smaller than a diameter of the upper vertical bore forming a lip, the lip configured and dimensioned to contact the undersurface of the hitch ball to prevent further downward displacement of the hitch ball.

Those having ordinary skill in the relevant art will appreciate the advantages provide by the features of the present disclosure. For example, it is a feature of the present disclosure to provide a trailer hitch system with a scale ball mount configured to display the trailer tongue weight of a loaded trailer. It is another feature of the present disclosure to provide a ball mount with a biasing component disposed below a hitch ball, and a displacement gauge for displaying the downward displacement of the hitch ball and the corresponding trailer tongue weight. It is yet another feature of the present disclosure to provide a ball mount with a plunger configured and dimensioned to contact a drop bar about which the ball mount rotates, the plunger being disposed in fluid communication with a dial for displaying a trailer tongue weight.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for measuring the tongue weight of a trailer, the apparatus comprising:
 a ball holder;
 a hitch ball disposed in the ball holder;
 a spring disposed below the hitch ball within the ball holder;
 a gauge disposed on one of the ball holder or the hitch ball, the gauge configured and dimensioned to display the tongue weight of a trailer based on the downward displacement of the hitch ball;

an indicator disposed between the hitch ball and the spring, wherein the ball holder comprises an aperture in which the hitch ball, indicator and spring are disposed; and wherein the spring is disposed in the aperture of the ball holder below the hitch ball and the indicator is disposed between the hitch ball and the spring in the aperture of the ball holder.

2. The apparatus of claim 1, wherein the spring is a urethane spring.

3. The apparatus of claim 1, wherein the spring is disposed in contact with an undersurface of a hitch ball support member, such that downward displacement of the hitch ball compresses the spring.

4. The apparatus of claim 1, wherein the gauge comprises an opening through which the indicator is viewable.

5. The apparatus of claim 1, wherein the gauge comprises a dial, wherein the linear travel of the indicator is converted to a rotational read out of the dial.

6. The apparatus of claim 1, wherein the hitch ball comprises a hitch ball support member and a reduced shank portion extending from an undersurface of the hitch ball support member.

7. The apparatus of claim 6, wherein the reduced shank portion extends at least partially into a center cavity of the spring.

8. The apparatus of claim 7, wherein the ball holder further comprises a through-hole at the bottom of the aperture, wherein the reduced shank portion extends into the through-hole.

9. The apparatus of claim 7, wherein the ball holder further comprises a pocket at the bottom of the aperture, wherein the reduced shank portion extends into the pocket.

10. The apparatus of claim 1, wherein the aperture further comprises an upper vertical bore and a lower vertical bore.

11. The apparatus of claim 10, wherein a diameter of the lower vertical bore is smaller than a diameter of the upper vertical bore.

12. The apparatus of claim 11, wherein the difference in the diameters of the upper vertical bore and the lower vertical bore forms a lip.

13. The apparatus of claim 12, wherein the lip is configured and dimensioned to contact an undersurface of the hitch ball to prevent further downward displacement of the hitch ball.

14. The apparatus of claim 1, wherein the gauge comprises a plurality of marks disposed on the hitch ball displaying the tongue weight based on the marks visible outside of the ball holder.

15. The apparatus of claim 1, wherein the gauge comprises a digital indicator.

16. The apparatus of claim 1, further comprising a shim disposed below the spring in the aperture.

17. A trailer hitch ball mount assembly comprising:
a shank configured and adapted to be installed into a hitch receiver;
a drop bar extending downwardly from the shank;
a ball support member engaged with the drop bar, the ball support member having a body member comprising an aperture;
a hitch ball disposed in the aperture of the ball support member; and
a gauge disposed on one of the ball support member or the hitch ball, the gauge configured and dimensioned to display a tongue weight of a trailer based on a force applied at the hitch ball; and a biasing component disposed in the aperture of the ball support member below the hitch ball and an indicator disposed between the hitch ball and the biasing component in the aperture of the ball support member.

18. The assembly of claim 17, wherein the gauge displays a tongue weight of a trailer based on the downward displacement of the hitch ball.

19. The assembly of claim 18, wherein the biasing component is a spring.

20. The assembly of claim 19, wherein the spring is a urethane spring.

21. The assembly of claim 18, wherein the biasing component comprises one or more bellview washers.

22. The assembly of claim 18, wherein the aperture comprises an upper vertical bore and a lower vertical bore.

23. The assembly of claim 22, wherein a diameter of the lower vertical bore is smaller than a diameter of the upper vertical bore.

24. The assembly of claim 23, wherein the difference in the diameters of the upper vertical bore and the lower vertical bore forms a lip.

25. The assembly of claim 24, wherein the lip is configured and dimensioned to contact an undersurface of the hitch ball to prevent further downward displacement of the hitch ball.

26. The assembly of claim 18, wherein the gauge is disposed on the ball support member and comprises an opening through which the indicator is viewable.

27. The assembly of claim 18, wherein the gauge comprises a dial.

28. The assembly of claim 18, wherein the gauge comprises a dial, wherein the linear travel of the indicator is converted to a rotational read out of the dial.

29. The assembly of claim 18, wherein the hitch ball comprises a hitch ball support member and a reduced shank portion extending from an undersurface of the hitch ball support member.

30. The assembly of claim 29, wherein the reduced shank portion extends at least partially into a center cavity of the biasing component.

31. The assembly of claim 30, wherein the ball support member further comprises a through-hole at the bottom of the aperture, wherein the reduced shank portion extends into the through-hole.

32. The assembly of claim 30, wherein the ball support member further comprises a pocket at the bottom of the aperture, wherein the reduced shank portion extends into the pocket.

33. The assembly of claim 17, wherein the gauge comprises a plurality of marks disposed on the hitch ball displaying the tongue weight based on the marks visible outside of the body of the ball support member.

34. The assembly of claim 18, further comprising:
a shim disposed below the biasing component in the aperture.

35. The assembly of claim 17, wherein the displacement gauge comprises a digital indicator.

36. The assembly of claim 25, wherein the displacement gauge further comprises a load cell disposed below the hitch ball in the aperture of the ball support member, the load cell configured to convey the downward force applied at the hitch ball to be displayed on the digital indicator.

37. A method of measuring the tongue weight of a trailer, comprising:
providing a ball holder comprising an aperture;
providing a hitch ball disposed in the aperture of the ball holder;

providing a gauge disposed on the ball holder;
placing a trailer hitch coupler of a trailer on the hitch ball;
providing a spring disposed below the hitch ball in the aperture of the ball holder;
providing an indicator disposed between the spring and the hitch ball in the aperture of the ball holder; and
displaying the tongue weight of the trailer on the gauge based on a force applied at the hitch ball.

38. The method of claim 37, wherein the step of providing a hitch ball further comprises:
identifying the size of the hitch ball; and
providing a biasing component disposed in the aperture of the ball holder, the biasing component comprising a biasing tendency suitable for producing measurable downward displacement when the ball is loaded with the weight of a trailer.

39. The method of claim 38, further comprising:
providing at least one shim disposed below the biasing component in the aperture of the ball holder to calibrate the measurable downward displacement and corresponding trailer weight displayed on the gauge.

40. The method of claim 38, wherein the biasing component comprises a urethane spring.

41. The method of claim 38, wherein the hitch ball comprises a hitch ball support member and a reduced shank portion extending from an undersurface of the hitch ball support member.

42. The method of claim 41, wherein the reduced shank portion extends at least partially into a center cavity of the biasing component.

43. The method of claim 42, wherein the ball holder further comprises a through-hole at the bottom of the aperture, wherein the reduced shank portion extends into the through-hole.

44. The method of claim 42, wherein the ball support member further comprises a pocket at the bottom of the aperture, wherein the reduced shank portion extends into the pocket.

45. The method of claim 37, further comprising:
placing a load on the trailer.

46. The method of claim 45, further comprising adjusting the balance of the load on the trailer to change the tongue weight displayed on the hitch ball displacement gauge.

47. The method of claim 46, further comprising:
adjusting the balance of a load on the trailer until the tongue weight displayed on the hitch ball displacement gauge is within an acceptable range.

48. An apparatus for measuring the tongue weight of a trailer, the apparatus comprising:
a ball holder comprising an aperture and a through-hole at the bottom of the aperture;
a hitch ball disposed in the aperture of the ball holder, the hitch ball comprising a hitch ball support member and a reduced shank portion extending from an undersurface of the hitch ball support member;
a urethane spring disposed below the hitch ball in the aperture of the ball holder;
an indicator disposed between the hitch ball and the spring in the aperture of the ball holder;
a shim disposed below the urethane spring in the aperture of the ball holder; and
a gauge disposed on the ball holder, the gauge comprising an opening through which the indicator is viewable, the gauge configured and dimensioned to display the tongue weight of a trailer based on the downward displacement of the hitch ball;
wherein the spring is disposed in contact with an undersurface of a hitch ball support member, such that downward displacement of the hitch ball compresses the spring;
wherein the reduced shank portion extends through a center cavity of the spring and into the through-hole of the ball holder;
wherein the aperture further comprises an upper vertical bore and a lower vertical bore, wherein a diameter of the lower vertical bore is smaller than a diameter of the upper vertical bore forming a lip, the lip configured and dimensioned to contact the undersurface of the hitch ball to prevent further downward displacement of the hitch ball.

49. An apparatus for measuring the tongue weight of a trailer, the apparatus comprising:
a ball holder;
a hitch ball disposed in the ball holder, wherein the hitch ball comprises a hitch ball support member and a reduced shank portion extending from an undersurface of the hitch ball support member;
a spring disposed below the hitch ball within the ball holder, wherein the reduced shank portion of the hitch ball extends at least partially into a center cavity of the spring;
a gauge disposed on one of the ball holder or the hitch ball, the gauge configured and dimensioned to display the tongue weight of a trailer based on the downward displacement of the hitch ball; and
an indicator disposed between the hitch ball and the spring, wherein the ball holder comprises an aperture in which the hitch ball, indicator and spring are disposed.

50. A method of measuring the tongue weight of a trailer, comprising:
providing a ball holder comprising an aperture;
providing a hitch ball disposed in the aperture of the ball holder, wherein the hitch ball comprises a hitch ball support member and a reduced shank portion extending from an undersurface of the hitch ball support member, and wherein the step of providing a hitch ball further comprises:
identifying the size of the hitch ball; and
providing a biasing component disposed in the aperture of the ball holder, the biasing component comprising a biasing tendency suitable for producing measurable downward displacement when the ball is loaded with the weight of a trailer, wherein the reduced shank portion extends at least partially into a center cavity of the biasing component;
providing a gauge disposed on the ball holder;
placing a trailer hitch coupler of a trailer on the hitch ball; and
displaying the tongue weight of the trailer on the gauge based on a force applied at the hitch ball.

\* \* \* \* \*